(12) United States Patent
Perry

(10) Patent No.: US 11,154,787 B2
(45) Date of Patent: *Oct. 26, 2021

(54) SYSTEMS AND METHODS FOR PROVIDING TIME-SHIFTED INTELLIGENTLY SYNCHRONIZED GAME VIDEO

(71) Applicant: Sony Interactive Entertainment LLC, San Mateo, CA (US)

(72) Inventor: David Perry, San Mateo, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,007

(22) Filed: Feb. 4, 2020

(65) Prior Publication Data

US 2020/0179813 A1 Jun. 11, 2020

Related U.S. Application Data

(63) Continuation of application No. 15/268,491, filed on Sep. 16, 2016, now Pat. No. 10,549,203.

(60) Provisional application No. 62/235,521, filed on Sep. 30, 2015.

(51) Int. Cl.
| | |
|---|---|
| *A63F 13/86* | (2014.01) |
| *A63F 13/35* | (2014.01) |
| *A63F 13/46* | (2014.01) |
| *A63F 13/49* | (2014.01) |
| *A63F 13/25* | (2014.01) |

(52) U.S. Cl.
CPC .............. *A63F 13/86* (2014.09); *A63F 13/25* (2014.09); *A63F 13/35* (2014.09); *A63F 13/46* (2014.09); *A63F 13/49* (2014.09)

(58) Field of Classification Search
CPC .......... A63F 13/35; A63F 13/46; A63F 13/49; A63F 13/86; A63F 13/25
See application file for complete search history.

(56) References Cited

U.S. PATENT DOCUMENTS 10,549,203 B2 * 2/2020 Perry ...................... A63F 13/53

* cited by examiner

*Primary Examiner* — William H McCulloch, Jr.
*Assistant Examiner* — Ankit B Doshi
(74) *Attorney, Agent, or Firm* — Penilla IP, APC

(57) ABSTRACT

Systems and methods for synchronizing game play of a video game include detecting selection of a video game for game play at a game server. In response, an instance of the video game is executed at the game server. The execution causes the game play to be provided to a game client for rendering on a main portion of a display screen of the game client. A pre-recorded video associated with the video game is provided for rendering in a second portion of the display screen while the game play is being rendered on the main portion of the display screen. The pre-recorded video rendering in the second portion is dynamically synchronized with the game play of the video game rendering in the main portion so that a game scene rendering in the pre-recorded video matches to a game scene of the game play rendering in the main portion of the display screen.

12 Claims, 12 Drawing Sheets

SYSTEMS AND METHODS FOR PROVIDING TIME-SHIFTED INTELLIGENTLY SYNCHRONIZED GAME VIDEO

CLAIM OF PRIORITY

This application is a continuation of and claims priority, under 35 U.S.C. § 120, to U.S. patent application Ser. No. 15/268,491, filed on Sep. 16, 2016, entitled "Systems and Methods for Providing Time-Shifted Intelligently Synchronized Game Video," which claims priority, under 35 U.S.C. § 119(e), to U.S. Provisional Patent Application No. 62/235,521, filed Sep. 30, 2015, entitled "Systems and Methods for Providing Time-Shifted Intelligently Synchronized Game Video," the disclosures of which are incorporated herein by reference in their entirety.

RELATED APPLICATIONS

This application is related to U.S. application Ser. No. 14/140,402 filed on Dec. 24, 2013, and entitled, "Systems and Methods for Generating and Sharing Video Clips of Cloud Provisioned Games," the disclosure of which is incorporated herein by reference in its entirety. This application is also related to U.S. application Ser. No. 15/268,493, filed on Sep. 16, 2016, and entitled, "Systems and Methods for Providing Augmented Data-Feed for Game Play Recreation and Dynamic Replay Entry Points," the disclosure of which is incorporated herein by reference in its entirety.

BACKGROUND

Field of the Invention

The present invention relates to systems and methods for defining, sharing and playing video games and mini-games in a cloud executed system.

Description of the Related Art

Cloud systems deliver services over a network (typically the Internet) using computing resources (hardware and software). The services, in the context of gaming, enable streaming of content to remote clients, wherein most processing is done on servers, which may be distributed. Input provided at the remote clients will, in turn, drive execution of the game on the servers, without the need for dedicated gaming hardware at the client's location. Due to the ease of accessing the games executing on the cloud systems, cloud gaming has been increasing in popularity because users find it easier to access more titles without complex hardware restrictions. Similarly, game suppliers find it easier to manage game code from centralized locations.

It is in this context that embodiments of the invention arise.

SUMMARY

Embodiments of the present invention relate to systems and methods for sharing of game play of video games within a game system that is executed on a game cloud. Several inventive embodiments of the present invention are described below.

A player is provided access to a plurality of video games available on a cloud server, based on a user account of the player, allowed to select a video game for game play at the cloud server and provide input to drive an outcome of the video game. The player's game play is used to generate a video recording of the game play session. The video recording also records telemetry obtained from game play of the video game and data signals for the video game provided by, for example, a game developer. The telemetry includes detailed information related to game play (such as position of a player's character within the video game, direction the player was facing, angle of his hand, head, etc.), at different points of game play when the video recording was generated. Data signals from the video game are related to events (e.g., "Boss Battle") occurring at different times. The telemetry and data signals enable relating different sections of the video recording to particular events (e.g., video recorded during boss battle) in the video game play. The video recording with the telemetry information provides a "smart" video that allows one to identify the events and actions happening at different moments of the game play.

A second user is allowed to play the video game by following the video recording of the player's game play, in substantial real time. In some implementations, the pre-recorded video of the player's game is embedded in picture-in-picture format in a portion of a display screen of a game client that is used by the second user for playing the video game. Following the player's recorded game play allows the second user to play the same video game, (e.g., battling the same monsters, overcoming the same obstacles, capturing the same flags, etc.). However, the second user may be taking a longer time to complete the task or challenge or hurdle presented than what was accomplished by the player in the video recording of the video game. In such a case, the system automatically pauses the rendering of the player's video recording and waits for the second user to catch up, and then automatically resumes rendering of the player's video recording when it detects that the second user is advancing again. When the second user gets ahead of the video recording, the video recording automatically fast forwards to catch up to the second user's game play.

The telemetry information recorded with the player's video recording is used to identify game play statistics (e.g., time taken to accomplish a challenge, number of attempts to complete a challenge, etc.), which are then used to perform a friends vs. friends game play comparison to indicate how well each one did playing the video game, and such comparison can be done for every moment or for every event/challenge of the video game. The telemetry information of the second user's game play may be used to playback and rewind the second user's actual gameplay. Additionally, information provided in the video recording (e.g., the telemetry information and data signals) may be used to recreate the actual game play, let the second user to either fast-forward or rewind through the video recording of the second user's game play, and enable the second user to restart the video game relating to any moment of the video recording.

In one embodiment, a method for sharing game play of a video game is disclosed. The method includes detecting selection of the video game for game play at a cloud server. The video game is associated with a pre-recorded video of a game play session of a player. The detection causes the game play of the video game to be provided to a game client for rendering in a main portion of a display screen of a game client. The pre-recorded video associated with the video game is provided for rendering in a second portion of the display screen while the game play of the video game is being rendered in the main portion of the display screen. The pre-recorded video of the video game rendering in the second portion is automatically synchronized with the game play of the video game rendering in the main portion of the display screen such that a game scene of the video game rendered in the second portion matches with the game scene of the game play rendering in the main portion of the display screen.

In some implementations, rendering speed of video frames of the pre-recorded video is dynamically adjusted to match with a speed of game play, so as to enable matching the game scene of the pre-recorded video with the game scene of the game play. The matching of the game scenes are performed using metadata generated from the pre-recorded video associated with the video game.

In some implementations, the pre-recorded video rendering in the second portion is paused when the game scene rendering in the main portion does not match with the game scene that is rendering from the pre-recorded video.

In some implementations, rendering of the pre-recorded video is resumed in the second portion upon detecting a match of the game scene of the game play rendering in the main portion to the game scene of the pre-recorded video. The matching of game scenes are performed using metadata generated during game play of the video game and from metadata obtained from the pre-recorded video.

In some implementations, resuming rendering of the pre-recorded video includes automatically advancing or rewinding video frames of the pre-recorded video rendering in the second portion so as to match to the game scene of the game play.

In some implementations, the game play of the video game causes generation of a second video. The second video is associated with the video game and is used for restarting the game play.

In some implementations, options are provided to identify an entry point for restarting the game play of the video game. The entry point is selected from the pre-recorded video or the second video associated with the video game and is used in identifying portion of executable code of the video game to execute for restarting the game play of the video game.

In another embodiment, a method for sharing game play of a video game, is disclosed. The method includes detecting selection of a mini-game for game play at a cloud server. The mini-game is defined for a portion of the video game and is provided at the cloud server for sharing. The mini-game is associated with an executable code for enabling game play of the portion of the video game defined in the mini-game, and a pre-recorded video of a game play session of a player for the portion of the video game. The selection causes the executable code of the mini-game to be executed at the cloud server. The game play of the executing mini-game is provided for rendering in a main portion of a display screen of a game client. The pre-recorded video associated with the mini-game is provided for rendering in a second portion of the display screen while the game play for the mini-game is being rendered in the main portion of the display screen. The pre-recorded video rendering in the second portion is dynamically synchronized with the game play of the mini-game currently rendering in the main portion of the display screen such that a game scene of the pre-recorded video rendering in the second portion matches with the game scene of the game play rendering in the main portion.

In one embodiment, a method for sharing game play of a video game is disclosed. The method includes detecting selection of the video game for game play at a cloud server of a game cloud system. The video game is associated with a pre-recorded video of a game play session of a player. Selection of the video game for game play is detected at the cloud server. The detection causes the game play to be provided for rendering in a main portion of a display screen of a game client. The pre-recorded video associated with the video game is provided for rendering in a second portion of the display screen while the game play for the video game is being rendered in the main portion of the display screen. The pre-recorded video of the video game rendering in the second portion is dynamically synchronized with the game play of the video game rendering in the main portion of the display screen such that a game scene of the video game rendered in the second portion matches with the game scene of the video game rendering in the main portion of the display screen. A second video is generated for the video game from a current session of the game play. The second video includes metadata related to the game play. The second video is associated with the video game.

In some implementations, options are provided to restart the game play of the video game. The restarting includes providing the second video for rendering in the second portion of the display screen. Options are provided for selecting an entry point within the second video for restarting the game play of the video game, wherein the entry point indicates a location within the video game for restarting the game play that is different from a start location. The game play of the video game is restarted from the selected entry point. The restarting causes the game play to be provided for rendering in the main portion of the display screen. The second video is provided to begin rendering from the selected entry point at the second portion of the display screen.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which.

DETAILED DESCRIPTION

Figure 1:
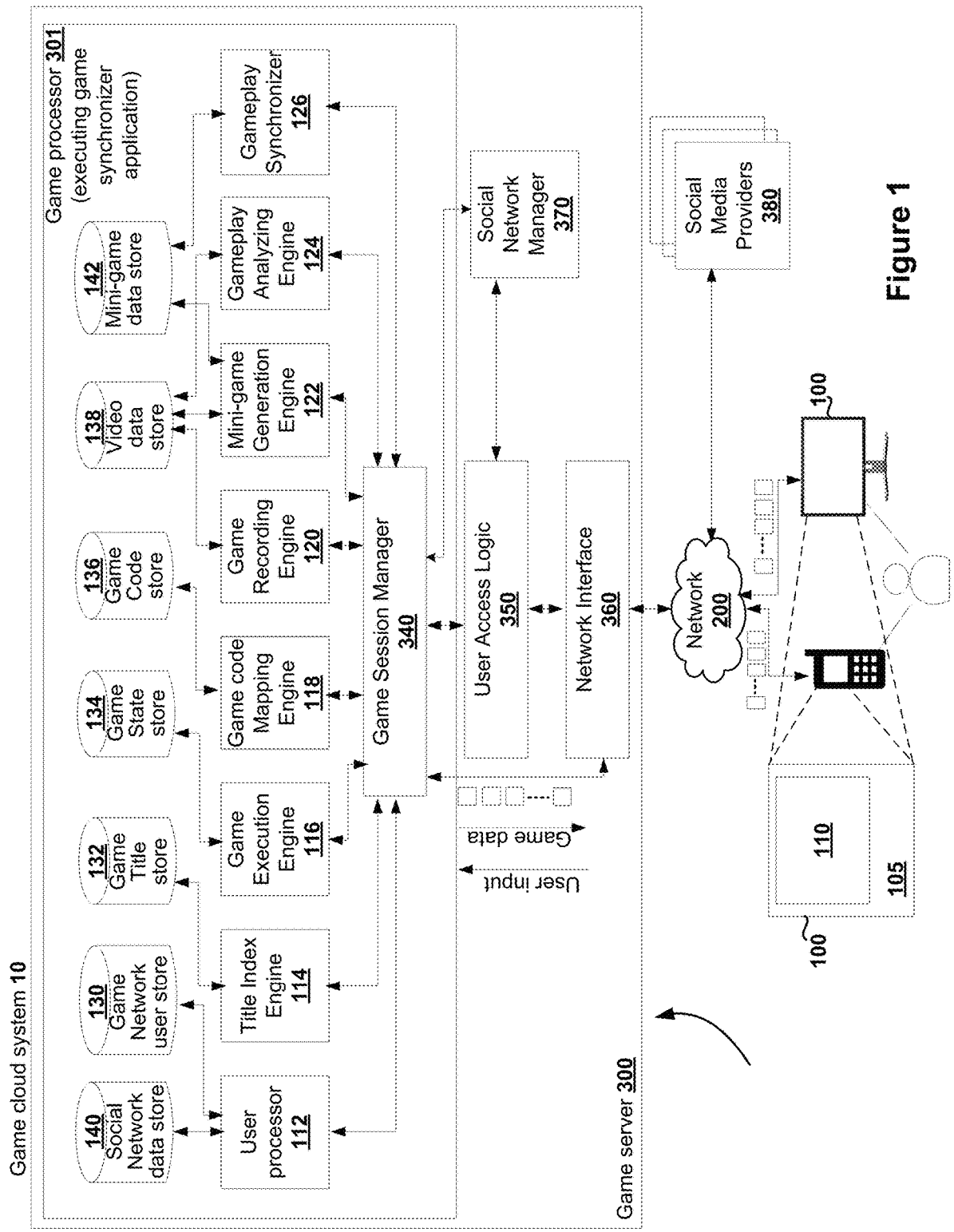
FIG. 1 illustrates a simplified block diagram of the generic game cloud system identifying various modules used for accessing, playing, and sharing of video games and mini-games stored in a game cloud system, in accordance with an embodiment of the invention.

The following embodiments describe systems and methods for managing execution and sharing of portions of video games and corresponding pre-recorded video for the portions of video games over a game cloud-based system. The sharing enables intelligent synchronization of the pre-recorded video of the portions of video games with game play. A game cloud-based system allows streaming of online game play of the video game, while allowing players to provide interactive input to the video game from remote locations using game client devices that are connected to the game cloud-based system over a network, such as the Internet. While a player plays the video game, a video recording of the video game is created, capturing the game play activity (including the player's interactive input) from a game play session. The video recording is associated with the video game.

The video game may correspond to a full video game that includes multiple levels, with each level of the video game providing multiple options, routes, sequences, functions, etc., for completing the challenges, tasks, levels, etc. A player may elect to share the full video game or a portion of the video game with other users to enable the other users to view the recording or play the portion of the video game shared by the player. For example, the player may have purchased the video game and may have access to the whole video game. Alternately, when the player elects to share the video game with other users, he may elect to share only portion of the functionalities of the video game or only a portion of the video game. Various embodiments described herein are directed to the sharing of a portion of the video game but can be extended to the sharing of the whole video game. The portion of the video game, thus, may be described as a part that is less than the whole video game or the whole video game with limited functionalities or the full video game with all the functionalities.

During or after game play of the video game, a player is provided options to select the video game or a portion of the video game for sharing. When the player elects to share a portion of the video game, the player may be provided with options to select a start and end point in the video recording to identify the portion of the video game for sharing. The selection of the start and end points in the video recording is used to generate a mini-game. The player-defined mini-game includes a portion of the video game that corresponds to the start and end points selected by the player from the video recording. As mentioned before, the generated mini-game may include all the features of the full video game, or may have less features, objects, controls, etc., than the full video game. The generated mini-game is associated with a video portion and an executable portion. The video portion provides a portion of the video recording of the video game play session from which the mini-game was generated. The executable portion includes the executable code to enable game play of the portion of the video game identified in the mini-game. The executable portion may inherit the set-up parameters of the video game from which the mini-game was generated.

As more and more players play the video game, it is possible that many different mini-games may be created for the same video game. Some of the mini-games created for a video game may include same start and end points while other mini-games may include different stand and end points. In cases where multiple mini-games generated for the video game have the same start and end points, the mini-games may be created by a same user or player or by different users or players. The video recording, in such cases, provided from the game play of the multiple mini-games may show variations of game play for achieving a goal or conquering a challenge/hurdle defined within. For example, the multiple mini-games may show variations in time, number of attempts, sequence of user activity, etc., to reach the goal.

The generated mini-games or the full video games with the associated video portion and the executable portion are shared with other users. In some embodiments, the mini-games or video games are shared by posting the video games or the generated mini-games to the game cloud system. In other embodiments, the video games or mini-games are shared by posting links to the mini-games on one or more social networks. As a result of the sharing, other users in the game network or social network will be allowed to access and play the shared video games or mini-games.

Each video game or mini-game shared on the game cloud system or the social networks is associated with an image that is most representative of content of the video recording associated with the video game or the mini-game. The video games and/or the multiple mini-games for a video game posted to the game cloud system or the social networks are managed by classifying, ranking and sharing the video games, mini-games, based on user interactions at the respective video games or the mini-games. User interactions, in some implementations, may include number of times a video game or mini-game is selected for viewing or game play, number of times a video game or a mini-game is selected for sharing, number of likes, number of recommendations, quality of the video game or the mini-game recording, rating of the players or users generating or sharing the video games or mini-games, etc. For example, as more and more users select a particular video game or mini-game for game play, the particular video game or mini-game may be ranked higher and presented more prominently in the game cloud system than video games or mini-games that were selected for viewing. In another example, video games shared by higher-ranked users/players or mini-games generated by higher-ranked users/players may be ranked higher when shared with other users on the game cloud system, on a game website or on one or more social networks.

When a user selects a shared video game or mini-game for viewing, the pre-recorded video of the video game or the mini-game is provided for rendering on a main portion of a display screen of a game client. Alternately, when the user selects a mini-game for game play, the executable portion associated with the mini-game is instantiated at a game server within the game cloud system. The executing of the mini-game causes the game play to be rendered on a main portion of the display screen. The main portion covers a substantial portion of the display screen and, in some implementations, is smaller than the whole display screen. As the game play is being rendered at the main portion of the display screen, the video portion associated with the mini-game is provided for rendering in a second portion of the display screen to allow the user to view the game play recorded for the selected mini-game at any time during the game play of the mini-game. The second portion is defined as a portion of the display screen that is smaller than the whole display screen and, in some implementations, is smaller than the main portion. In other implementations, the second portion may be equal to the main portion. In other implementations, the second portion may be smaller than the main portion but can be dynamically adjusted to be equal or greater than the main portion of the display screen.

During game play of the mini-game, the video portion rendering in the second portion of the display screen is dynamically synchronized with the game play of the mini-game currently rendering on the main portion of the display screen. The dynamic synchronization may include adjusting the video portion dynamically so as to advance video frames, rewind video frames, pause the pre-recorded video rendering in the second portion till a game scene of the game play of a user playing the mini-game matches to a game scene rendered in the game play. In some implementations, the rendering speed of video frames streaming from the game server may be adjusted to match with speed of game play of the mini-game.

The game play of the mini-game may be used to generate a mini-game play video. The generated mini-game play video captures the user activities of the user during game play of the mini-game. The mini-game play video of the user may be shared with other users by associating the mini-game play video with the mini-game, in one embodiment, so that the associated mini-game play video is available for viewing and/or rendering upon selection. In this embodiment, the mini-game is associated with both the pre-recorded video and the newly generated mini-game play video. In an alternate embodiment, the mini-game play video may be shared with other users by generating a new post of the mini-game at the game cloud system and using the newly generated mini-game play video for the video portion. Alternately, the mini-game with the newly generated mini-game play video may be shared as links in one or more social networks. Further details of the various embodiments will be described below with reference to the exemplary drawings.

It will be obvious, however, to one skilled in the art, that the present invention may be practiced without some or all of these specific details. In other instances, well known process operations have not been described in detail in order not to unnecessarily obscure the present invention.

FIG. 1 illustrates a simplified block diagram of a game cloud system 10 used for managing selection, execution and sharing of video games, in accordance to an embodiment of the invention. The game cloud system 10 may also be engaged for generating and sharing mini-games within the game cloud system 10, in accordance with an alternate embodiment of the invention. The game cloud system 10 provides game applications, services, gaming related digital content, and interconnectivity among the various game systems, game applications, users and social networks. For example, the game cloud system 10, in some embodiments, may include a network of game servers 300 distributed geographically and one or more social media providers 380 so that one or more game clients 100 may access any of the game server(s) 300 or the social media providers 380 remotely from any geo location. Network interface 360 allows communication between the game clients 100, game servers 300 and social media providers 380 over a communication network 200, such as the Internet. The network interface 360 enables wired or wireless communications.

In some embodiments, the social media providers may be part of the game cloud system 10, whereby user relationships are managed without the need for external social media providers 380. In other embodiments, the game cloud system 10 may operate as a hybrid system, wherein social relationships are managed using social graph data (not shown) obtained from third party social media providers 380, via application programming interfaces. In such embodiments, social relationships may be stored within a social network data store 140 and adjusted based on user interactions within the game cloud system 10. The adjusted social relationship data may be specific to the game cloud system and used during playing of video games or mini-games. Alternately, the adjustment made to the social relationship data may be updated to corresponding social media providers 380.

The one or more of the game servers 300 are configured to execute a game processor module 301. The game servers 300 may be any type of server computing device available in the game cloud system 10. In some implementations, one or more of the game servers 300 may be virtual machines (VMs) running on a hypervisor of a host machine, and accessed remotely through the network 200. In such implementations, the one or more virtual machines are configured to execute the game processor module 301 utilizing the hardware resources available to the hypervisor of the host machine.

The game processor module 301 is configured to manage execution of a plurality of video games, generation of video recording of game play of video games, generation and sharing of video games, mini-games within the game cloud system 10. The game processor module 301 may execute a game synchronizer application, for example, that includes a plurality of modules and one or more execution engines executing on a game server 300. The plurality of modules are configured to receive and process various game-related and user-related data, manage execution of video games, generation of mini-games, video recording of game play, and sharing of video games, mini-games, video recordings with users over the network 200. In some implementations, the different modules may include execution engines that are configured to independently execute on one or more game servers 300 using data available to the game server 300.

A game client 100 is used to access the services, game-related content or other content provided by the game cloud system 10, as well as game-related or other content provided by social media providers 380. The game client 100 includes or is associated with a display screen 105. The display screen 105 includes a user interface 110 for requesting access to the services, such as video games, and for providing user interactions. The display screen 105 also includes a display portion for rendering game play of the video games. It should be noted that the game client 100 may be any type of computing device having at least a memory and a processor module that is capable of connecting to the game server 300 over the network 200. The game client 100 may use wired or wireless communication, may be portable or not portable.

Some examples of game client 100 include a personal computer (PC) (including a desk top computer, a laptop computer), home theater PC, general purpose computer, mobile computing device, a tablet computing device, a wearable computing device, head-mounted displays, hybrids that provide touch screen capability in a portable form factor or any other types of computing devices that can connect over the network 200 and interact with the game server 300. One example game client 100 can be a portable phone device that runs a mobile operating system and is capable of connecting to the game server 300 over the network 200 to access various applications available at the game server 300.

The display screen 105 may be part of the game client 100 or may be a display screen that is separate from the game client 100 but connected to the game client 100 through wireless or wired connection. The display screen 105 associated with the game client 100 may be a touch-screen display, a display provided by a flat-panel monitor, a cathode ray tube (CRT) monitor, a liquid crystal display (LCD) monitor, a light-emitting diode (LED) monitor, Organic LED (OLED) monitor, a plasma monitor or digital light processing (DLP) monitor, a display surface or device on which a projector can project content, or any other display device or surface or screen that is capable of rendering content.

In some embodiments, the network 200 may be a wide area network (e.g., the Internet), a local area network, a metropolitan area network, a personal area network, a wireless local area network, or any combinations thereof.

In some implementations, the game client 100 can install a client-side version of an application that enables execution and/or viewing of the games stored and shared by the game cloud system 10. The game client 100 may also be used to communicate with one or more social media providers 380 via network 200 such that the game client 100 may be able to access video games, execute game play, view video recordings of game plays shared in social media streams. For example, the game client 100 may be able to access a video game posted in a social media network by selecting a link on a social media page, in a stream, in a news-feed, or in a post provided by a social media provider 380, and viewing or playing the video game using the game client 100.

In one embodiment, a player can access the video games available in the game cloud system 10 through a user account that was created by the player and registered with the game cloud system 10. In such embodiments, the game cloud system 10 provides a user ID for the registered user account and saves the user ID in a user profile associated with the registered user account of the player. The user profile associated with the registered user account is saved in a user database in a game network user store 130 and used for authenticating subsequent requests from the player.

After the player registers with the game cloud system 10, the player may be presented with an option to designate the type of game client 100 through which the player is accessing the game cloud system 10. In one embodiment, a list of game client options may be presented for player selection. Similarly, the player may also be presented with an option to designate the type of controller device used to provide user input during game play of a video game. In one embodiment, a list of controller options may be presented for player selection. In other embodiments, logic within the game processor 301 executing at the game cloud system 10 can be configured to automatically detect the game client type and/or the controller device type that are used to access the user account. For example, at the time of accessing a user account on the game cloud system, the game client 100 may send information to the game server 300 identifying itself as well as a connected controller device. Based on this information, the game server 300 within the game cloud system may determine an appropriate content (e.g., video game content) output configuration and input parameter configuration that may be used to provide gaming content and other content viewing experience optimized for the player's client device and controller device. These configuration and input parameters may be used to generate the pre-defined setup parameters. The setup parameters provide information at the game client 100 to define and/or customize game controls, game objects, etc., used for playing the video game. In addition to the setup parameters, a social media interface (not shown) may also be provided at the game client 100 to enable social interaction with other users.

A player may request access to video games available on the game cloud system 10 through a user interface 110 provided on the display screen 105 of the game client 100. In some embodiments, the request and the player may be authenticated locally at the game client 100 before the request is forwarded to the game server 300 for further authentication and processing.

In response to the request, a game synchronizer application is executed on a game processor 301 of the game server 300. The game synchronizer application includes a plurality of modules whose interactions and roles will be explained in greater detail below. When the request is received at the game server 300, a user access logic 350 at the game server 300 is used to detect the access request originating from the player either through the game client 100 or other suitable devices. The access request, in some implementations, may include user account information, such as user name and user password for the user account. In response, the user access logic 350 may communicate the user account information to a user processor 112, where the user request is validated. The user processor 112 may retrieve the user profile information for the player stored in the game network user store 130 and verify the information provided in the request. Upon successful authentication of the player, the user access logic 350 may communicate the user account information to a social network manager 370 so that the social network manager 370 can request and receive contact information for social contacts associated with the player from one or more social media providers 380 via network interface 360. The social network manager 370 may transmit the received contact information to the game network user store 130 for storing alongside the user profile of the player and additionally in the social network data store 140 for subsequent access. The contact information may be used during sharing of video game or any mini-game that the player may generate during or after playing a video game available at the game cloud system 10.

After authentication of the player, the player can access the services provided by the game cloud system 10 via a game session manager 340. The game session manager 340 may communicate the user request to the user processor 112 so that the user processor 112 may record or update the user profile information of the player stored in the game network user store 130 with the access request information.

The game session manager 340 may then interact with a title index engine 114 to identify video game titles that are available to the user account of the player. The title index engine 114 may interact with a game title store 132 to obtain the video game titles available to the user account of the player. The video game titles available to the user account may include video game titles that were previously purchased by the player from the game cloud system, previously purchased by the player and made available at the game cloud system, previously played by the player, and/or free video game titles made available by video game providers. In some embodiments, the available game titles may include game titles associated with a particular genre identified from the player's expressed interest or based on player's prior selection of video games. The title index engine 114 may categorize and prioritize the identified video game titles, populate a graphical user interface (GUI) with the identified video game titles, and return the GUI through the game session manager 340, network interface 360 to the game client 100 over the network 200 for rendering at the display screen 105. Alternately, relevant data related to the identified game titles may be provided to the game client 100 to allow the game client 100 to generate the GUI and render on the display screen 105. The data presented in the GUI may include an initial image for each video game title, wherein the image selected is most representative of content within the video game title. Additionally, each video game may be associated with a plurality of mini-games. In some embodiments, the mini-games are defined for the video games by the players that have purchased or have access to the video games. In other embodiments, the mini-games are defined by players or other users from video games or mini-games shared by one or more social contacts of the players/other users.

A player may select a video game title for game play from the GUI presented in the display screen 105. In response to detecting the player's selection of the video game title, a game play session is initiated by the game session manager 340. The game session manager 340 may interact with a game state store 134 to obtain saved game state, if any, for the selected video game title. The game state may have been saved in the game state store 134 from a previous game play session of the player. Thus, when the player's selection of the video game for game play is detected, the system retrieves the previous game state of the video game for the player stored in the game state store 134, so that the video game may be restarted from a previous game play stop point that is identified from information provided in the game state. If no previous game state exists for the selected video game title for the player, the beginning of the video game is identified to be the start point. Once the start point is identified, the game session manager 340 interacts with a game execution engine 116 to execute the game code for the identified video game title stored in game code store 136, from the start point. The game code for the selected video game is executed by the game processor 301 of the game server 300. Video frames of the game data from the game play of the selected video game are returned as streaming video data via the network interface 360 to the display screen 105 of the game client 100 for rendering. Based on the type of game client 100 and the display screen 105 associated with the game client 100, the game video frames may be properly compressed, formatted before being forwarded to the game client 100 for rendering.

During game play of the video game title, user interactions provided at the game client 100 or through a game controller (not shown) are transmitted to the game server 300 to affect an outcome of the game play of the video game executing on the game cloud system 10. In response to the user interactions, the game session manager 340 may communicate with game execution engine 116 to influence an outcome of the video game, and with the game recording engine 120 to generate a recording (e.g., video, audio, etc.) of the game play session as the game play progresses. The game play recording is stored in a video data store 138 as a pre-recorded video for the video game.

In one embodiment, along with the game play recording, game related metadata may also be stored in the video data store 138 and be used to provide information related to game state of the video game. In some implementations, during game play as the recording is being generated, or after game play, the recording of the game play is analyzed by a gameplay analyzing engine 124 to generate metadata detailing the game play. The generated metadata may identify game related telemetric information related to or in addition to data signals defined for the video game by, for example, a game developer. The game-related telemetric information may include data signal information related to occurrence of specific events, challenges, hurdles, levels, pre-defined game awards that can be won, etc., provided when the video game was developed, and information related to actions from the player to reach goals, overcome hurdles or challenges, respond to events, etc. For example, the telemetric information may include details of when a wall appears in a particular game scene, when a fireball is to be thrown, when a player jumped over a fence or climbed over the wall, when a player fought with an opponent, overcame or killed an opponent, which direction the player was moving or facing during game play, etc. Additional information related to data signals provided in the video game may include information related to a game scene that was rendered at different times of game play, such as where an object was with reference to other objects in game scene, what hurdles or challenges are ahead, what logical paths are available, etc. The metadata may also identify the game-related parameters of the video game including the game level included, game status, game objects used, etc.

The metadata provides a rich source of information related to the video game and game play of the video game to identify what has occurred in the past, what the current state of the video game is, what is or was rendered in the various game scenes, and what hurdles, challenges, objects, levels, goals, etc., were overcome and what lies ahead. Additionally, the metadata may identify location of the player's avatar within the game, direction and/or orientation of the player, or location, orientation, types of input devices used by the player when providing user interactions during game play, speed of game play, number of attempts to achieve a certain goal/level or overcome a challenge, amount of time spent in the video game, style of interaction, etc. The game play captured in the recording is augmented with this metadata obtained from analyzing the game play. This augmented data for the video game provides sufficient detail to allow re-creation of any portion of the video game, actual game play of the video game, and to identify video frames that correspond to specific game scenes.

The generated metadata is associated with the video recording of the video game. In some implementations, the metadata information identified during analysis by the gameplay analyzing engine 124 is stored in video data store 138 and associated with the video recording of the video game.

Once the recording of the game play is generated and stored in the video data store 138, a player may be interested in sharing the video game or at least a portion of the video game with other users. The player may express interest in sharing by selecting a share button or share option provided at the user interface 110 during or after game play. In response to the player's expressed or implied interest in sharing, the game session manager 340 may interact with the game recording engine 120 to retrieve the recording for the video game generated during the player's game play session from the video data store 138 and forward the recording to the game client 100 for rendering at the user interface 110. The recording may include the video frames of game play and metadata related to the game play. Along with the recording, one or more options or controls may be provided at the user interface 110 of the game client 100 to allow the player to select a portion of the recording of the video game that the player wishes to share with other users.

Using the options or controls, the player may identify the portion of the video recording defined by a start point and an end point, for sharing. In some embodiments, the portion defined by the start and end points may include a trigger event, a task to be performed, a sequence of steps or moves, or a challenge to be handled or overcome. The game session manager 340 receives the selection data from the game client 100 and may engage a mini-game generation engine 122 to generate the mini-game for the identified portion. The mini-game generation engine 122 may interact with the game recording engine 120 to access the recording of game play for the video game from the video data store 138, and receive the start and end point selection provided at the game client 100 through the game session manager 340. Using the start, end point selection and information provided in the recording, the mini-game generation engine 122 may generate a mini-game by identifying a portion of the executable code that corresponds to the start and end point selection. The identified portion of the executable code provides the necessary functionality (e.g., game code, game attributes, game state, etc.), to enable game play of the selected portion of the video game. A mini-game is generated and the identified portion of the executable code is used to define the executable portion of the mini-game. Since the mini-game is generated from the video game recording, the portion of the recording (e.g., video frames) that correlate with the specified start and end points, is extracted and associated with the generated mini-game as video portion of the mini-game.

In one embodiment, the mini-game generation engine 122 uses the game play metadata retrieved from the video data store 138 to identify what parts of the game code of the full video game are needed to define the mini-game. A video segment generator within the mini-game generation engine 122 may interact directly or through the game session manager 340 with a game code store 136 to obtain the game code of the video game, and with a game code mapping engine 118 to identify the parts of the game code that correlate with the start and end points defined by the player. The information obtained from the game code mapping engine 118 is provided to the mini-game generation engine 122 for processing and generating a mini-game. In some implementations, the code for the mini-game may be identified using pointers or references within the game code of the full game. These pointers and/or references may be stored in the mini-game data store 142 and referenced during game play of the mini-game. By using pointers and/or references, the need to create new code package for every produced mini-game is reduced. Alternately, the pointers or references are used by the mini-game generation engine 122 to identify and extract the portion of the executable code from the video game to generate the mini-game. The mini-game generation engine 122 may use the set-up parameters and game attributes provided in the telemetry data of the recording, when generating the mini-game so that other users that select the mini-game for game play are provided with a substantially similar game play experience as the player whose game play was used to generate the recording. The set-up parameters, for example, may have been defined for or by a player during game play of the video game. The game attributes, in one embodiment, may have been defined for the video game by a game developer.

In some embodiments, the executable portion includes code associated with an event, a challenge, a hurdle, a task, etc., identified within the start and end points defined by the player, and the video portion associated with the mini-game may include a recording of actions taken by the player to perform the event, overcome the challenge, cross the hurdle, complete the task, etc.

Figure 2:
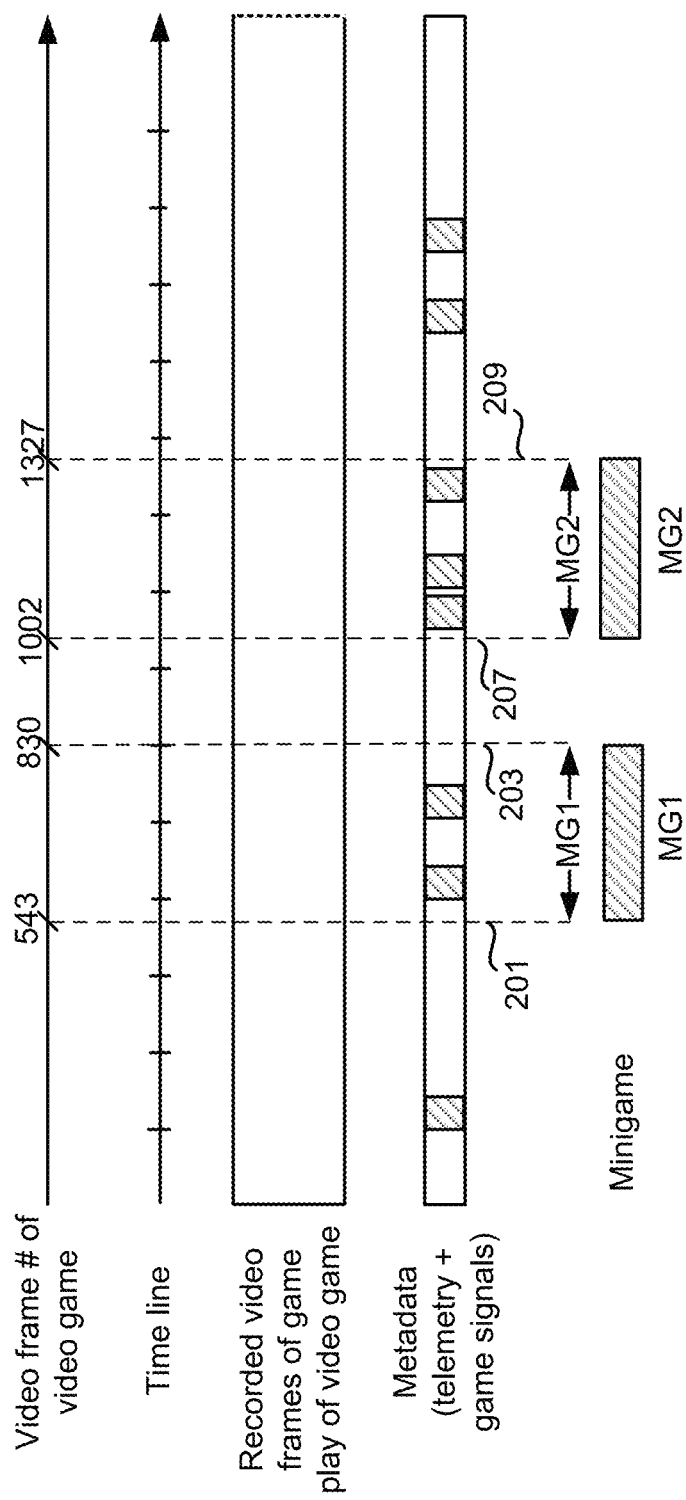
FIG. 2 illustrates a simplified representation of a process for creating mini-games from a video recording, in accordance with one embodiment of the present invention.

FIG. 2 illustrates an example mini-game generated by the mini-game generation engine 122 using start and end points specified from a recording of a video game play of a player, in one embodiment. The start and end points correspond to specific video frames in the recording. For example, the player may select a start point 201 and an end point 203 within the video recording to generate a mini-game for sharing. The player specified start and end points (201, 203) in the video recording is used by the mini-game generation engine 122 to identify corresponding code for the portion of the video game and generate the mini-game. In some implementations, the player may request more than one mini-game to be generated by providing multiple start and end points. For example, as shown in FIG. 2, a first set of start and end points (201, 203) may be specified by the player to generate mini-game 1 (MG1), a second set of start and end points (207, 209) to generate mini-game 2 (MG2) and so on. The mini-game generation engine 122 may obtain the game code of the video game, identify corresponding executable code encompassing start and end points 201, 203 and 207, 209 from the video game and use it to define the executable portion of the mini-games MG1, MG2, respectively. Similarly, the video portions for the generated mini-games (MG1, MG2) corresponding to the first and second set of start and end points (201, 203, and 207, 209) are identified, extracted from the video recording of the video game and used to define the video portion for the respective mini-games, MG1, MG2. The metadata for the portion of the video game including telemetry and data signals are used in identifying the corresponding executable code and the video portion when generating the mini-games MG1, MG2. The generated mini-games (MG1, MG2, etc.) along with the metadata and video recording are stored in the mini-game data store 142 for subsequent retrieval. The generated mini-games may also be posted to a game cloud system for sharing.

Figures 3A, 3B:
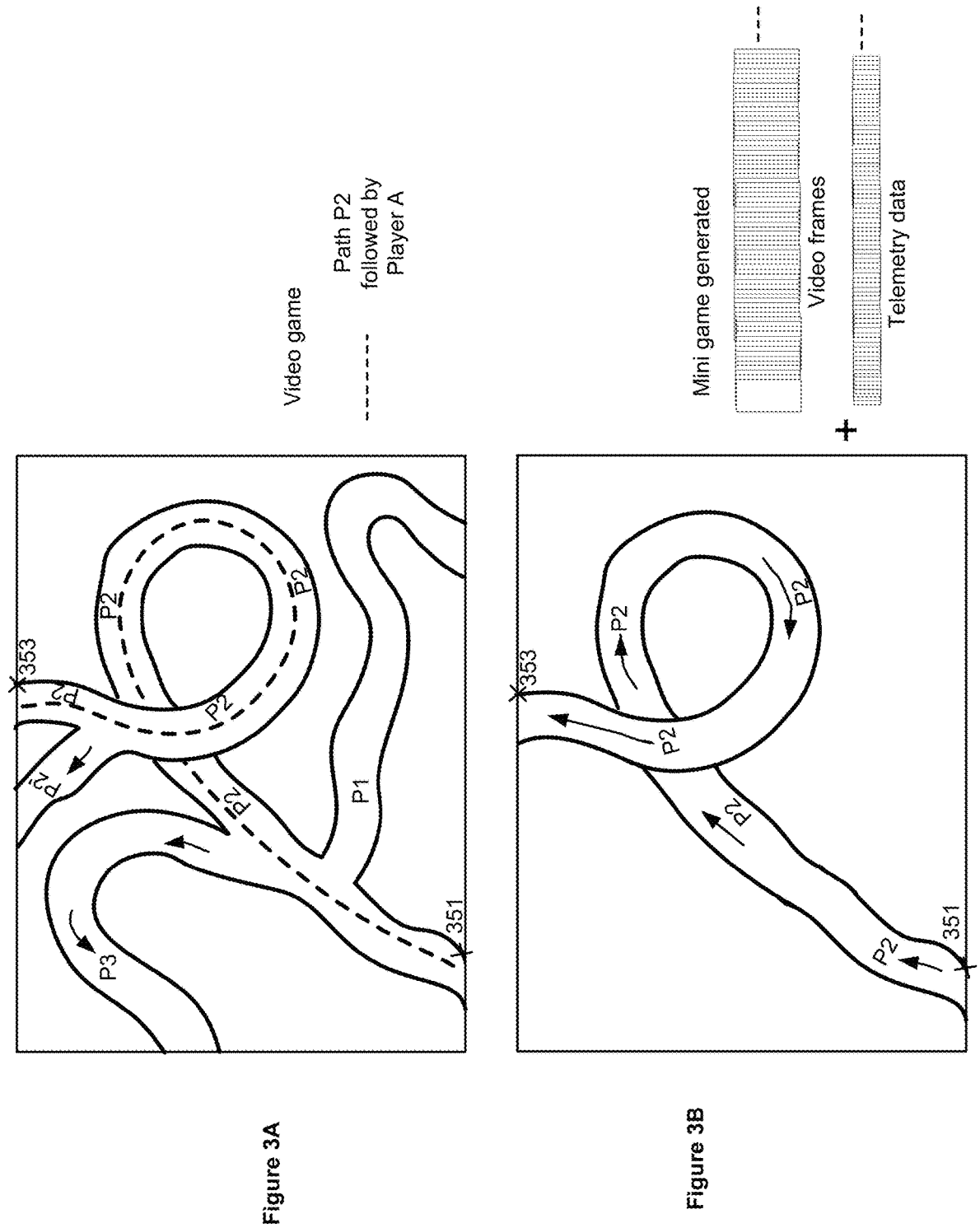
FIG. 3A illustrates a portion of the video game captured in the pre-recorded video of the video game from a player's game play session, in accordance with one embodiment of the present invention.
FIG. 3B illustrates a portion of the video game that is included in the mini-game generated from a player's video game recording, in accordance with one embodiment of the present invention.

FIGS. 3A and 3B illustrate the game content that is included in the mini-game. FIG. 3A illustrates the options that are available for a player within a portion of a video game that was used to generate mini-game(s). For example, the portion of the video game may identify paths P1, P2, and P3 that are available to the player during game play. One or more of the paths may have additional sub-paths defined in the game scene. For example, as illustrated in FIG. 3A, path P2 may have a sub-path P2' due to the presence of a fork. But, during game play, the player may have followed path P2 all the way through and overcome hurdles, challenges, such as jumped over a chasm, leaped over a canyon, confronted and defeated one or more opponents, captured flags, etc., along the way. When the player decides to generate a mini-game for the game play by selecting start and end points (e.g., 351, 353) along path P2, for example, the mini-game that is generated will include executable code for rendering only path P2 defined between the start and end points 351, 353. The generated mini-game may be shared to allow other users to experience the same challenges that the player encountered during his/her game play.

FIG. 3B illustrates the game path, in one embodiment, that would be included in the mini-game generated from the start and end points 351, 353, specified by the player during or after game play of the video game. The mini-game includes executable code and video portion that encompasses path P2 between start and end points 351, 353. The other paths P1, P3 and sub-path P2' are not included in the generated mini-game. The executable code of the mini-game would present all the hurdles, challenges, actions that the player encountered along path P2 between start and end points 351, 353, during his game play. In some embodiments, providing access to the exact path followed by a player (i.e., overcoming certain hurdles, challenges, etc.) may be more important than achieving an end goal contained in the mini-game. In an alternate embodiment, the game path that is included in the mini-game generated from the start and end points 351, 353 may include all the paths that are available. For instance, the mini-game may include all the paths P1, P2, P3 and sub-path P2' so as to allow a user to play the portion of the video game including the hurdles, challenges, actions that are between the start and end points. This may be the case where achieving the end goal may be more important than the path followed to reach the end goal. It should be noted once again, that the player may select a specific portion to generate a mini-game for sharing or may provide the whole video game for sharing.

As players create mini-games from video game titles, the code and/or pointers, references for the created mini-games can be associated with the creating player and stored in the game network user store 130. This way, each created mini-game can be defined by its original creator, and user metrics regarding game play of the mini-games can be attributed or linked to the original creator. Additionally, the creator information may be used to manage the mini-games when the mini-games are posted to the game cloud system, a game website or a social network for sharing. The mini-game includes the executable code necessary to render the functionality or part of the functionality of the video game that was used to create the content of the selected portion of the video recording. Further, in some embodiments, the generated mini-game inherits the set-up parameters that were used by the player, so as to allow a user that selects the mini-game for game play to have substantially similar game play experience as the player.

The content within the portion of the recording that was used to generate the mini-game is analyzed. Based on the analysis, a video frame that is most representative of the content of the mini-game is identified and associated with the mini-game as its representative image. The generated mini-game is shared with other users by posting to the game cloud system or provided as links in one or more social networks associated with the player using social contact information stored for the player in the social network data store 140 or using the social contact information stored in the user profile within the game network user store 130. The generated mini-game with the executable portion, the video portion, the metadata and the representative image is stored in a mini-game data store 142.

Aside from generating the mini-games using input from the player, the mini-game generation engine 122 may manage the mini-games stored in the mini-game data store 142. The mini-game management may include, but not limited to, mini-game classification, mini-game ranking based on a ranking of a player that generated the mini-game, interactions of other users that played the mini-game in response to the posting or sharing of the mini-game, number of views registered for the video portion, number of game plays registered for the mini-game, etc.

In addition to ranking and classifying the mini-game, the content of the mini-game may be analyzed to identify user-related attributes and game play parameters that are included within. A metric accumulator module within the gameplay analyzing engine 124 may be used by the game session manager 340 to identify the user related attributes and game play parameters. For example, some of the game play parameters that may be identified may include game type, number of hurdles, challenges, enemy objects presented, type of terrain presented, game play options provided, game awards/rewards available at specific points/levels, etc., and user-related parameters may include the type and number of challenges, hurdles, events encountered by the player, number of times the player overcame the challenges or hurdles, amount of time the player took in overcoming the challenge or hurdle, number of game points or rewards the player won, etc. These user-related attributes and game play parameters are stored as part of the metadata information within the mini-game data store 142 and used to present relevant information to users during game play of the mini-game.

Once the mini-game is created, the mini-game may be posted to the game cloud system or to a social network, via social network manager 370, to enable sharing with one or more social network friends of the player or other users that share similar interest as the player, or other generic users, in response to a request for sharing received from a player. Alternately, the created mini-game may be posted to a webpage in a game network maintained by the game cloud system 10, for sharing with the player's game network friends or acquaintances or other users. In one example, in response to a share request received by the game session manager 340, the game session manager 340 may instruct the mini-game generation engine 122 to obtain information related to the mini-game from mini-game data store 142 and provide the information to the social network manager 370. The game session manager 340 may then instruct or signal the social network manager 370 to provide the information as posts or links within social media feeds, streams, etc., at one or more social media provider sites 380, so that the mini-game can be accessed using the links/posts, video portion viewed and/or executable portion used by the social network users to play the mini-game.

When a user wishes to view or interact with the mini-game available in the game cloud system 10, the user may send an access request to the game cloud system 10 requesting access to the mini-game. In some implementations, user authentication may be needed to access the mini-game. In other implementations, user authentication may not be needed to access the mini-game and any user may be allowed access to the mini-game. In the implementations where user authentication is needed, the user may be verified by the user processor 112 before providing access to the mini-game. The verified user information may be updated to an existing user profile of the user maintained in the game network user store 130 or used to generate a user profile of the user. Further, the game related parameters for the mini-game are updated in the video data store 138 to reflect the user access of the mini-game.

User access request is received at the user access logic 350 through network interface 360. The user access logic 350 may interact with the user processor 112 through game session manager 340 to authenticate the user and/or verify the request. In response to receiving the access request from the user access logic 350, the game session manager 340 initiates a game session for the user and proceeds with user authentication by interacting with the user processor 112. The user processor 112 authenticates the user using user account information obtained from a game network user store 130, which stores user profile information of a plurality of users that are authorized to access the video games and mini-games available at the game cloud system 10. Alternately, the user processor 112 may just verify the request to ensure it is a valid request and is for content hosted or available within the game cloud system. Once the user is authenticated and/or the request is verified, user profile information of the user stored in the game network user store 130 is updated with the access request and the user is provided access to the mini-game identified in the request.

The user may select an option to view or play the mini-game that was generated and shared by the player. When a user selects the mini-game for viewing, the game session manager 340 interacts with the mini-game generation engine 122 to retrieve the mini-game video from the mini-game data store 142 and forwards the video recording of the selected mini-game as data stream through the network interface 360 to the game client 100 for rendering on a main portion of the display screen 105 of the game client 100. The video portion may, in some implementations, be formatted at the game cloud system 10 to a format that is compatible for rendering at the main portion of the display screen 105 of the game client 100, prior to being transmitted to the game client 100.

When the user selects the mini-game for game play, an instance of the executable code associated with the mini-game is executed by the game session manager 340 at the game server 300, and the game play is provided to the game client 100 for rendering on the main portion of the display screen 105. It should be noted that the main portion may be less than an entire part of the display screen. The game session manager 340 interacts with the mini-game generation engine 122 to obtain the executable code associated with the mini-game from the mini-game data store 142, and directs the game execution engine 116 to execute an instance of the executable code of the mini-game. The executable code of the mini-game allows the user to play the mini-game. User input provided at the game client 100 is used to influence the outcome of the mini-game executing on the game server 300.

As the user input is being received and the outcome of the mini-game adjusted, the game session manager 340 engages the gameplay analyzing engine 124 to analyze, in substantial real time, the user's game play of the mini-game. As part of the analysis, a metric accumulator module within the gameplay analyzing engine 124 identifies game parameters of the mini-game (e.g., hurdles, challenges, route options, events, etc.), and determines user attributes of the user (e.g., time taken to complete hurdles or challenges, number of attempts taken to complete hurdle, speed of game play, etc.). The actions and interactions provided by the user at the user interface 110 during game play are used to compute the user's game scores (e.g., game points, game awards, etc.), etc.

In addition to instantiating the executable portion of the mini-game and providing game play to render at the main portion of the display screen associated with the game client 100, the game session manager 340 may interact with the mini-game generation engine 122 to obtain the video portion of the mini-game from the mini-game data store 142. The video portion of the mini-game is then provided to the game client 100 for simultaneous rendering in a second portion of the display screen 105 while the game play of the mini-game is being rendered in the main portion of the display screen 105. The video portion of the mini-game includes game play details of the player that generated the mini-game. The game session manager 340 provides the video of the mini-game through the network interface 360 to the game client 100 as data streams. The second portion of the display screen 105 is less than an entire part of the display screen. In some implementations, the second portion may be smaller than the main portion. The simultaneous rendering of the video portion of the mini-game in the second portion would allow the user to view and, in some implementations, follow the player's game play during playing of the mini-game.

The game session manager 340 may engage the gameplay analyzing engine 124 to analyze the video recording of the player that is being rendered in the second portion to identify the user attributes of the player. The game parameters, user attributes and computed game scores associated with the mini-game, user and/or the player identified by the gameplay analyzing engine 124 are returned to the game client 100 for rendering either in the main portion or in the second portion of the display screen 105 as game play statistics, during game play of the mini-game by the user.

Figure 5:
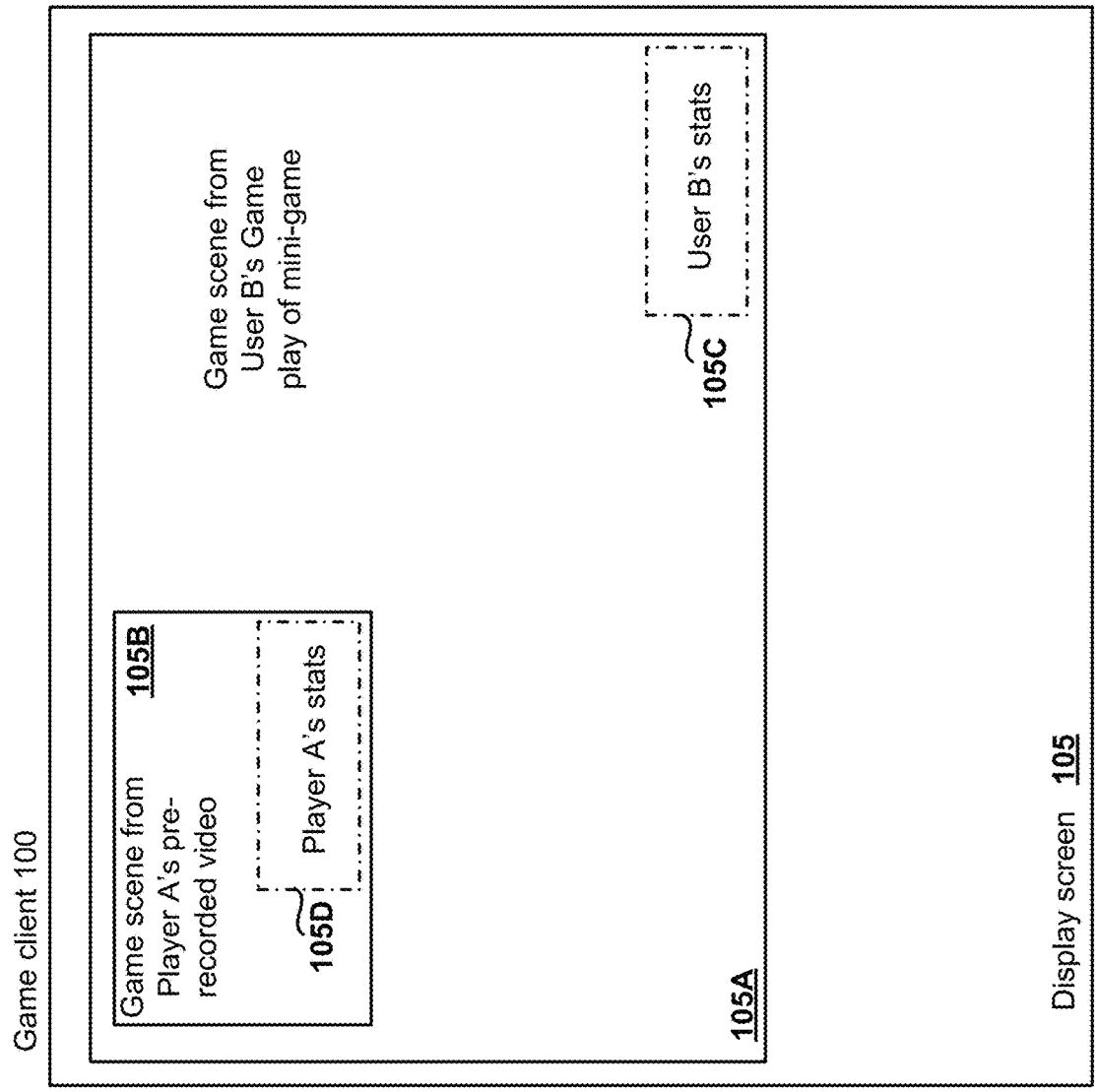
FIG. 5 illustrates a simplified representation of a display screen of a game client that is used to render different content during game play of a mini-game, in accordance with one embodiment of the present invention.

FIG. 5 illustrates an example embodiment wherein user and/or player attributes are provided for rendering at different portions of a display screen 105, in one embodiment. As has been discussed, a display screen 105 associated with a game client 100 includes a main portion 105A and a second portion 105B. Although the second portion 105B is shown to be inside the main portion 105A, it should be noted that other variations may also be employed including presenting the second portion 105B outside of and below the main portion 105A in the display screen 105, etc. The main portion 105A is less than a whole part of the display screen 105. The second portion 105B is defined to be less than a whole part of the display screen 105 and, in some implementations, may be less than the main portion 105A. The main portion 105A is used to render game play of a mini-game selected by a user. In some implementations, the second portion 105B is used to render a pre-recorded video of the mini-game that captures a player's game play of the portion of the video game that is included in the mini-game. In other implementations, the second portion 105B is used to render a pre-recorded video of the mini-game that captures another user's game play of the mini-game. For example, the mini-game may be associated with video game recordings of one or more players and/or users. In such implementations, the user that is currently playing the mini-game may be provided with options to select the pre-recorded video of the player or another user for rendering in the second portion and such options may be provided at the time when the user selects the mini-game for game play.

User's game inputs during game play are used to determine the user's attributes and informational messages related to the user's attributes are generated. These informational messages may relate to the user's current game statistics (i.e., live statistics of the user), which may be presented in a separate window 105C or as informational overlay within the main portion 105A of the display screen. Similarly, a player's attributes may be determined from the telemetry data provided within the metadata associated with the recording of the mini-game and presented in a separate window 105D or as an overlay within the second portion 105B. For example, the player's actions to overcome a hurdle, combat an enemy, etc., may be identified within the pre-recorded video of the mini-game. Informational messages related to the player's actions may be determined and presented as overlays or in a separate window 105D within the second portion 105B as the pre-recorded video of the event or hurdle is being rendered in the second portion 105B. Additionally, game parameters may be determined and presented as informational overlays or in separate windows at either the main portion 105A or second portion 105B. For example, events, challenges, hurdles that are coming ahead in the game play may be determined and presented in separate windows on the main portion 105A of the display screen. As the telemetry data captured within the metadata of the video recording provides sufficient details of the game play of the player, it is easier to identify what events, hurdles, etc., are coming ahead within the mini-game by analyzing the pre-recorded video of the mini-game. The overlays may be presented for a short period of time and faded out so as to provide a clear view of the game play rendering in the main portion and the video recording in the second portion. The informational message overlays provide the users with sufficient details of the activities, events, challenges that have occurred or will be occurring during game play.

Referring back to FIG. 1, depending on the skill, experience and knowledge of the user with respect to the mini-game, the user may progress at the same speed as the player, at a slower speed or at a faster speed. The game session manager 340 is intelligently able to sense the speed of progress of the user's game play, and to automatically adjust the speed of the video of the player's recording that is rendering in the second portion so that the game scene rendering in the second portion matches to the game scene of game play of the mini-game rendering in the main portion. In order to determine when to dynamically adjust the video, the game session manager 340, in some implementations, identifies the progress made by the user during the game play of the mini-game using the metadata and doing a temporal comparison with the game play of the player rendering in the second portion. For example, user input provided by the user at the game client 100 during game play of the mini-game is transmitted to the game session manager 340 of the game server 300 to influence the outcome of the mini-game. The game session manager 340 may interact with the game execution engine 116 and provide the user input received from the game client 100 to allow the game execution engine 116 to adjust the outcome of the mini-game that is currently being executed.

The game session manager 340 then uses the gameplay synchronizer 126 to perform the temporal comparison of the game play rendering in the main portion of the display device of the game client 100 with the game recording of the player rendering in the second portion of the display screen. The gameplay synchronizer 126 interacts with the game execution engine 116 to identify the video frame(s) for the game scene of the mini-game that is currently being rendered at the main portion. The gameplay synchronizer 126 then compares the data provided in the video frame against the video frame related to the game scene of the player's video that is currently being rendered in the second portion to determine if the player's video has to be dynamically adjusted to match the game scene of the player's video with the game play of the user. For example, the gameplay synchronizer 126 may interact with the game code store 136 to determine if the context of the game scene from the game recording of the player is ahead of the current game play rendering in the main portion or behind. Based on the comparison, the gameplay synchronizer 126 sends out a signal to the game session manager 340 instructing it to advance the video frames that are currently being streamed to the game client 100, rewind the video frames, slow the speed of rendering of the video frames or pause the video frames so as to allow the game play to match to the video scene of the video recording. The game session manager 340 and the gameplay synchronizer 126 may be able to perform this comparison using the metadata that is associated with the mini-game.

Figure 4A:
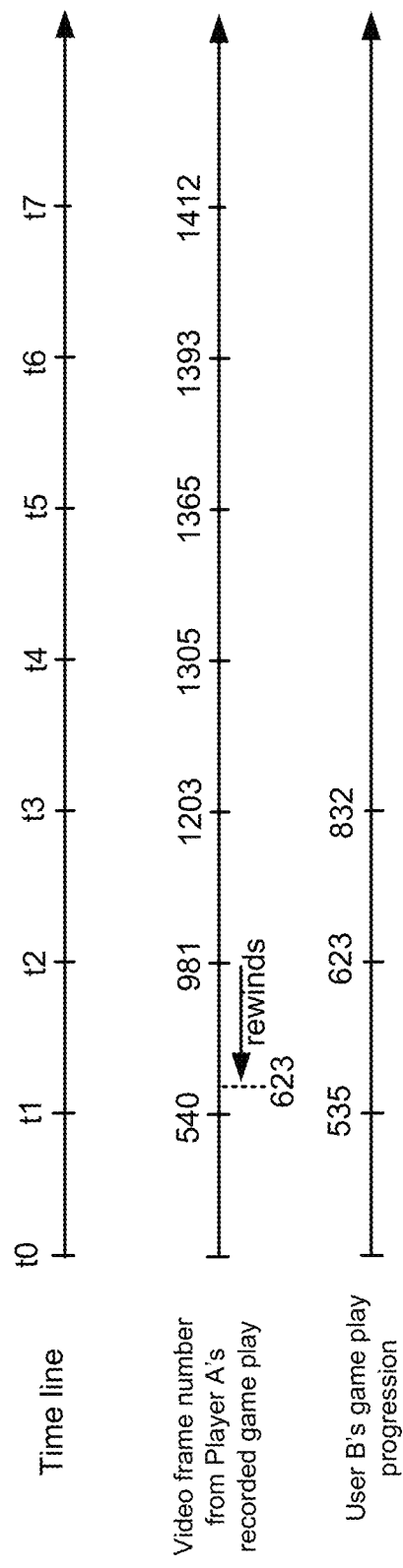
FIG. 4A illustrates a simplified representation of video frames from a player's pre-recorded video across a time line that is used for synchronizing to a user's game play, in accordance with one embodiment of the present invention.
Figure 4B:
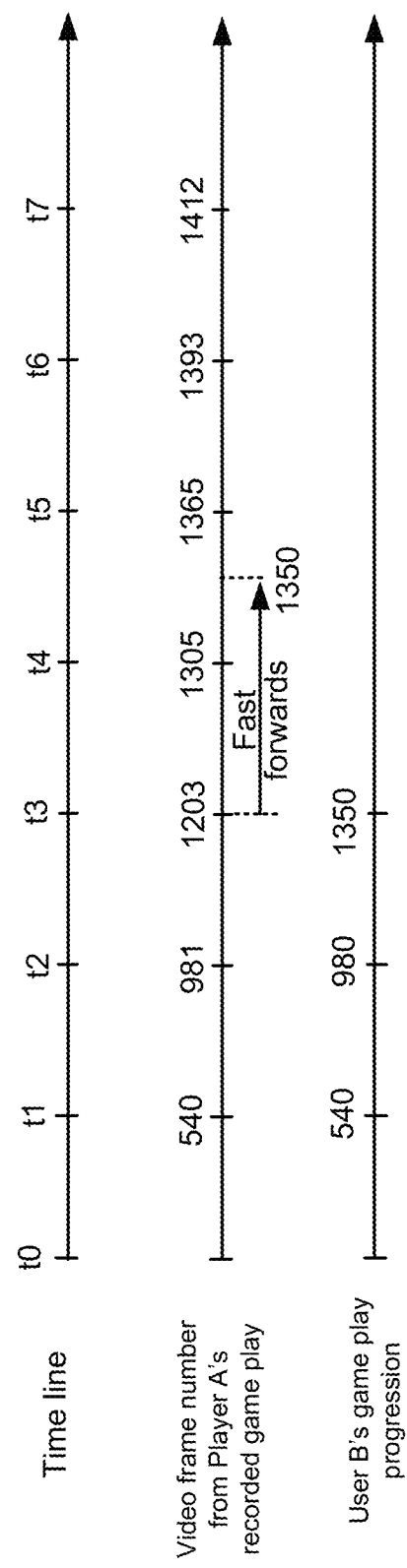
FIG. 4B illustrates a simplified representation of video frames from a player's pre-recorded video across a time line that is used for synchronizing to a user's game play, in accordance with an alternate embodiment of the present invention.

FIGS. 4A and 4B illustrate different embodiments where the game scene from the player's recording is dynamically adjusted to match with the game scene of a user's game play. FIG. 4A illustrates an example embodiment where the video frames of the player's video recording rendered in the second portion are to be dynamically rewound to match with the game play of the user rendering in the main portion of the display screen. As illustrated, at time t1, the player's video is at a game scene represented by video frame 540 while the user is at a game scene represented by video frame 535. At time t2, the player's video is at game scene represented by video frame 981 while the user is at game scene represented by video frame 623. This may be the case when the user is a novice user, for example, and is able to progress through the mini-game at a much slower pace than the player, who might be an expert user. As a result, the gameplay synchronizer 126 sends a signal to the game session manager 340 to dynamically rewind the player's video recording so as to match the game scene of the video rendering in the second portion to the game scene (represented by video frame 623) of the game play of the user rendering in the main portion. In some implementations, the comparison may be done periodically and in other implementations, the comparison may be done dynamically as the game play is progressing.

In some embodiments, when the comparison identifies a difference of video frames that is within a pre-defined threshold (e.g., 50 or 100 frames), the gameplay synchronizer 126 may ignore the difference and not send any signal to the game session manager 340. This might be the case in FIG. 4A, wherein at time t1 the difference in video frames between the player's video and the user's game play was about 5 frames. However, when the comparison identifies a significant difference, as at time t2 in FIG. 4A, the gameplay synchronizer 126 sends a signal to the game session manager 340 to dynamically rewind the video to the video frame that matches with the user's game play scene. Based on the signal received, the game session manager 340 identifies the video frame of the player's video recording using the associated metadata and dynamically adjusts the video frame of the video recording to the game scene that corresponds with the game scene of game play currently rendering in the main portion. The game session manager 340 forwards the adjusted video recording to the game client 100 so that the video can begin rendering in the second portion 105B of the display screen 105 from the adjusted video frame. In some implementations, the pre-defined threshold may depend on the type of mini-game that is being played. For example, when the mini-game relates to a high intensity video game, the pre-defined threshold may be higher than for a low intensity video game. In some embodiments, the video frame matching might not provide the optimal outcome as the progress of game play by different users may be different. As a result, in these embodiments, the gameplay synchronizer 126 may match the context of game play of the video game rendered in the main portion with the content of the video game recording rendered in the second portion using the information contained in the metadata. For example, the context may identify a certain challenge in a certain level of the video game and the metadata may be used to match to a particular scene of game play of the video game with the corresponding scene in the video recording.

FIG. 4B illustrates another embodiment where the video frame of the game play is ahead of the recording. For example, at time t1, both the player's recording rendering in the second portion and the user's video frame from current game play rendering in the main portion are shown to be at a game scene represented by video frame 540. At time t2, the player's recording was at a game scene represented by video frame 981 while the user's game play was at the game scene represented by video frame 980. However, the difference between the two video frames (player's recording and user's game play) was below a pre-defined threshold (e.g., 50 video frames). As a result, the gameplay analyzing engine 124 would ignore the difference and not send any signal to the game session manager 340. The game play and the video recording continue to render in the respective portions (105A, 105B, respectively) of the display screen. At time t3, the player's recording is shown to be at a game scene represented by video frame 1203 while the user's game play is shown to be at a game scene represented by video frame 1350. The gameplay synchronizer 126 identifies the difference in the video frames at time t3 and determines if the difference is above or below the pre-defined threshold.

In the embodiment illustrated in FIG. 4B, it is determined that the difference is above the pre-defined threshold (e.g., 50 video frames). As a result, the gameplay synchronizer 126 sends a signal to the game session manager 340 to automatically advance the video frame of the recording to match the video frame of the game scene of game play (i.e., 1350) so that when the player's video is rendered in the second portion, the game scene being rendered in the second portion matches with the game scene of the user's game play rendered in the main portion of the display screen of the game client 100 and it continues to match from this time onwards. The metadata associated with the mini-game is used to identify the video frames matching the game scene of the user's game play and perform the automatic adjustment to the video rendered in the second portion. As mentioned earlier, matching of video frames is one way and an alternate way of matching the game scenes using the context of the game play content may also be employed. The game session manager 340 may perform periodic verification and automatic adjustment to ensure that the game scene from the player's recording matches the game scene of the game play. The game session manager 340 with the aid of other modules of the game synchronizer application executing in the game processor 301, thus, intelligently performs time-shifted synchronization of the player's recording with the user's game play so that the user can continue to view the game play of the player while playing the mini-game.

In some implementations, as part of adjusting the video recording during game play of the mini-game, the speed of rendering of the video frames in the video recording may be dynamically adjusted to render slowly or fast depending on whether the user's game play is ahead or behind the player's recording rendering in the second portion of the display screen of the game client. In these implementations, the gameplay synchronizer 126 may send a signal to the game session manager 340 to decrease or increase the number of video frames that are being streamed to the game client 100.

In other embodiments, when the user's game play is slow, rendering of the player's recording may be paused to allow the user's game play to catch up to the game scene of the player's recording where it was paused and once the user's game play has caught up to the game scene, rendering of the player's recording may be resumed. In some embodiments, the resumption of the player's recording may also include reducing the speed of rendering to match with a pace of the user's game play. Thus, depending on each user's game playing skill, familiarity, knowledge of the mini-game, the player's recording is dynamically adjusted to allow the user to follow the video recording while completing the challenge or event or task defined in the mini-game.

In some embodiments, during game play of the mini-game, the user may execute a sequence of inputs that may take the user through a different path in the game play than the one that is being rendered in the second portion. As a result, the game scene of the game play may not match with a game scene of the player's recording. In such embodiments, the player's recording may be paused and the game session manager 340 may wait till a game scene of the user's game play matches with a game scene in the player's recording or context matching may be performed before resuming the rendering of the player's recording. The game session manager 340 may perform the verification periodically to determine if a match occurs between the user's game play and the player's recording. Once the game session manager 340 detects a match of the user's game play with the player's recording, the game session manager may resume the streaming of the player's recording from that point onwards to the second portion 105B of the display screen 105.

In some embodiments, the user may be provided with options in the second portion of the display screen to specify a different entry point to begin game play of the mini-game. For example, options may be provided in the second portion of the display screen, during the game play of the mini-game, to allow the user to select an entry point from where the user wishes to begin game play of the mini-game. The selected entry point may correspond to a section of the mini-game that is different from the section that is currently being rendered. For example, the user may have begun his game play of the mini-game from the starting point of the mini-game. During game play of the mini-game, the user may decide that he wants to play a different section of the mini-game. The user may use the options provided in the second section to specify an entry point within the player's recording that is being rendered in the second portion of the display screen. The selected entry point corresponds to a different section of the mini-game from where the user wishes to begin his game play. The game play of the mini-game is resumed from the selected entry point. Game play is streamed for rendering on the main portion of the display screen and the video recording of the mini-game from the selected entry point is provided for rendering the second portion of the display screen.

In an alternate embodiment, the user may wish to replay the mini-game for a section so as to try and see if he can better his own performance in that section. In such embodiments, the user may use a recording of his previous game play of the mini-game and use the options for selecting a start point for the section that he wishes to replay. In this embodiment, the user's previous game play recording is rendered in the second portion and the options are provided for the user to select the section from within the recording.

The game session manager 340 receives the user selection and may dynamically fast forward or rewind to the specified section in the mini-game and begin the game play from that section. To identify the specific section defined by the user selection, the game session manager 340 may use the game code mapping engine 118 to identify the executable code of the mini-game that correlates with the identified section defined by the entry point. Once identified, the game session manager 340 may signal the game execution engine 116 to begin executing the executable code of the mini-game from that point onward so as to allow the user to play the selected section of the mini-game. Simultaneously, the game session manager 340 may interact with the gameplay synchronizer 126 to adjust the video recording of the player to start from the specified entry point and begin transmitting the video frames to the game client from the specified entry point. In the event, the user uses his own recording of prior game play, the second portion may render the recording of his prior game play from the beginning of the section defined by the user's entry point selection. The video frames from the adjusted video recording are rendered in the second portion of the display screen and dynamically adjusted so as to match with the section of game play rendering in the main portion.

Figure 6B:
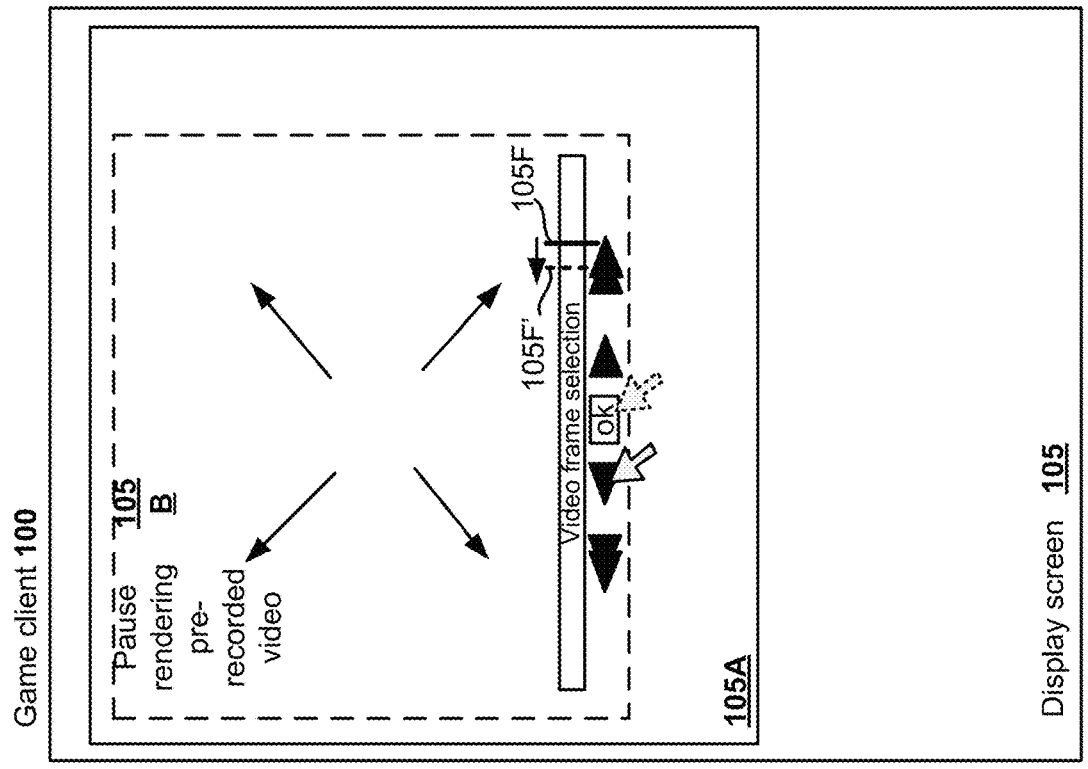
FIGS. 6A, 6B and 6C illustrate a second portion of the game client used for selecting an entry point for starting or restarting game play of a video game, in one embodiment of the invention.
Figure 6A:
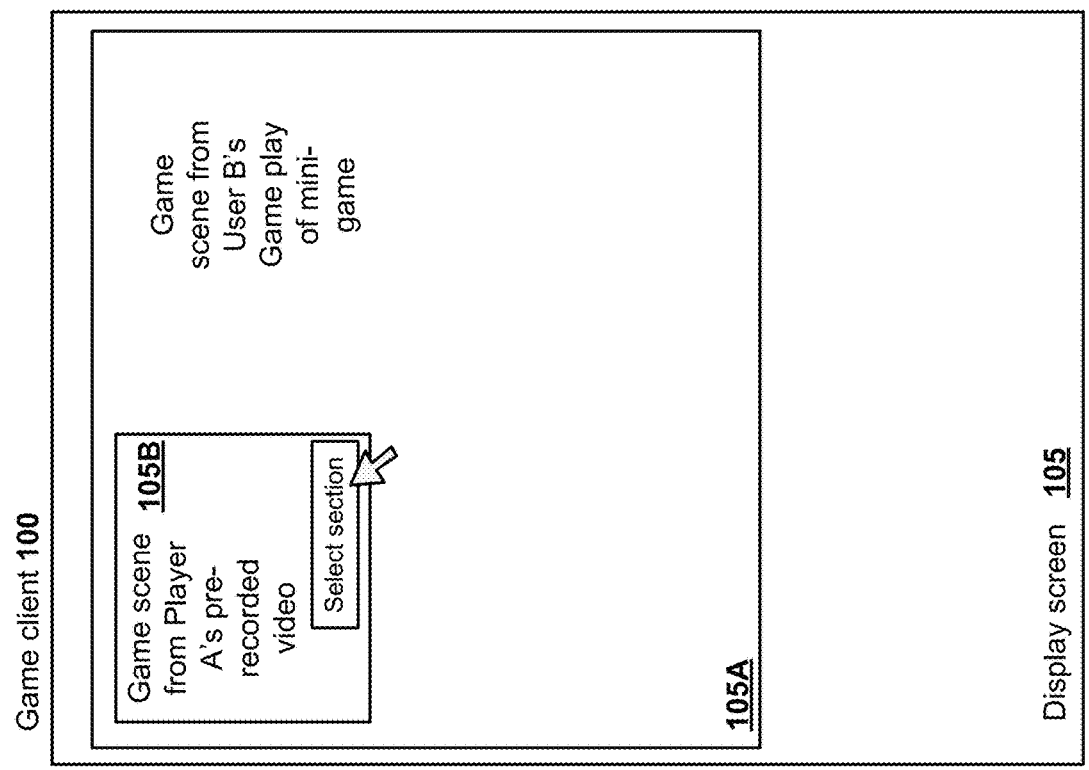
Figure 6C:
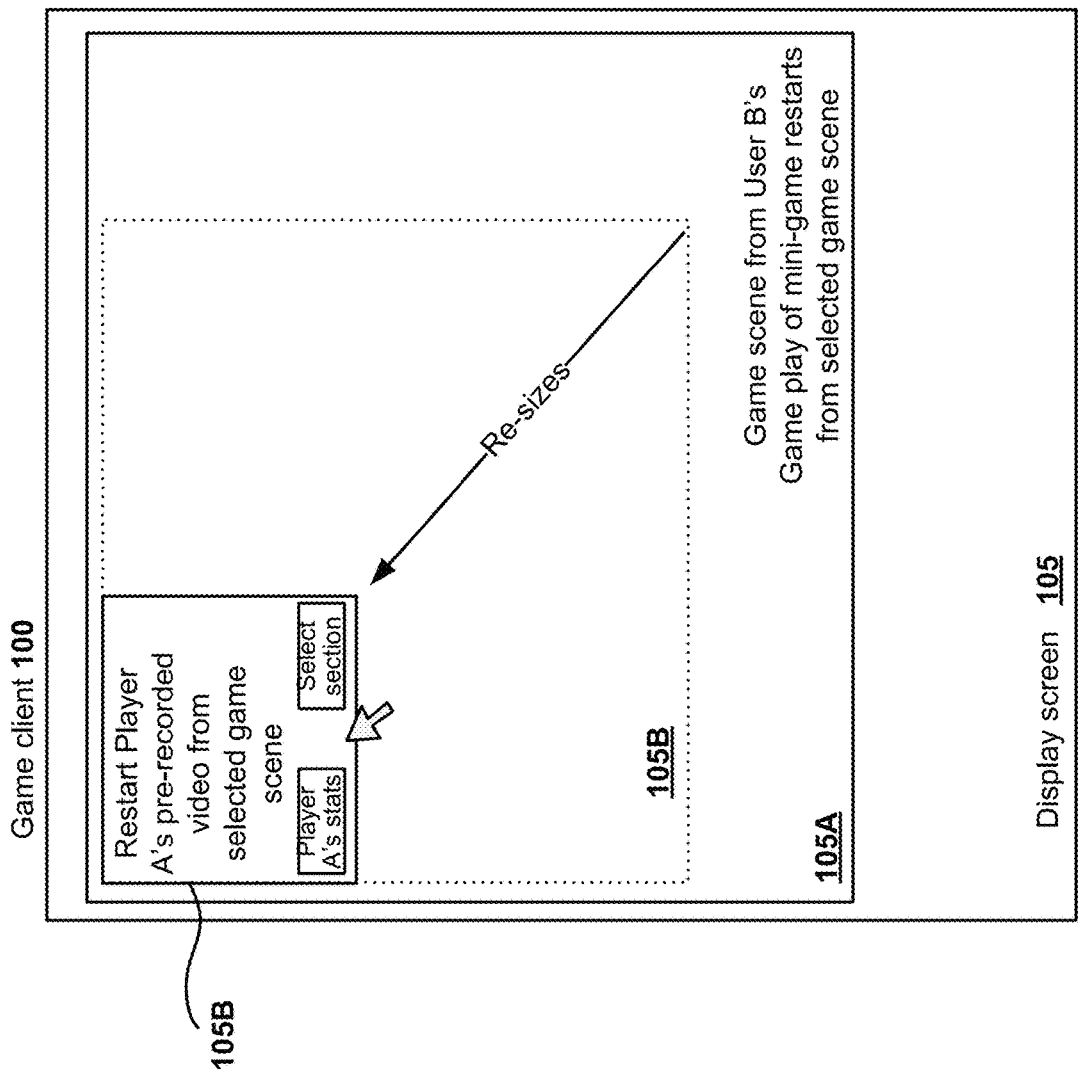

FIGS. 6A-6C illustrate a rendition of a game client, where a user is provided with an option to select a different section of the mini-game for game play, in one embodiments of the invention. FIG. 6A illustrates the relative size of the second portion 105B prior to the user choosing the "select section" option presented in the second portion 105B. When a user selects the select section option to define a different entry point in the mini-game to begin game play, the game session manager 340 may detect the user selecting the option at the second portion 105B and, in response, provide a signal to dynamically enlarge the second portion 105B of the display screen 105 to substantially cover the main portion 105A, as illustrated in 6B. Further, the game session manager 340 may resize the rendering aspect of the video recording to fit within the enlarged second portion. The resized player's video recording is forwarded to the game client 100 for rendering. In addition to the player's video recording, one or more controls may be provided for selecting the entry point from where to restart the game play of the mini-game. The controls, in some implementation, allow the user to fast forward or rewind the video to the desired entry point. Alternately, the controls allow the user to move an indicator forward and backward to select the section. In the embodiment illustrated in FIG. 6B, an indicator is moved from position 105F backward to position 105F' that corresponds to a beginning of the section that the user desires to replay. In alternate implementations, the controls may allow the user to provide pointers to the appropriate section. User selection is used to adjust the mini-game start point for the user. After the user has made his selection, the second portion may be returned to its original size, as illustrated in FIG. 6C, so as to allow the game play of the mini-game to be rendered in the main portion of the display screen from the selected entry point. The player's recording is returned for rendering from the selected entry point. The player's recording is formatted to allow it to be rendered in the re-sized (i.e., original size) second portion.

In some implementations, while the user is playing the mini-game, the player's attributes, such as game score, game points, etc., obtained or computed from the player's game play may be rendered in the second portion. The game score, game points, and player's attributes may be obtained by analyzing the metadata that is associated with the player recording. Simultaneously or separately, the user's attributes may be dynamically computed while the user is playing the mini-game and rendered in the main portion of the display screen during game play of the mini-game. In some embodiments, the user attributes are used to generate textual overlay for rendering in the main portion of the display screen and the player's attributes may be provided as textual overlay for rendering in the second portion of the display screen. In other embodiments, the user attributes and player attributes are presented as informational messages in separate windows, as was described with reference to FIG. 5. In some implementations, the user's attributes are compared against the player's attributes and informational message related to this comparison may be presented at the main portion 105A and/or the second portion 105B of the display screen 105. For example, the comparative results of the user's attributes and the player's attributes are generated at different times during the course of game play of the mini-game, and provided as overlays at the main portion 105A and/or the second portion 105B to indicate similarities or differences in the attributes of the user and the player.

Figure 7A:
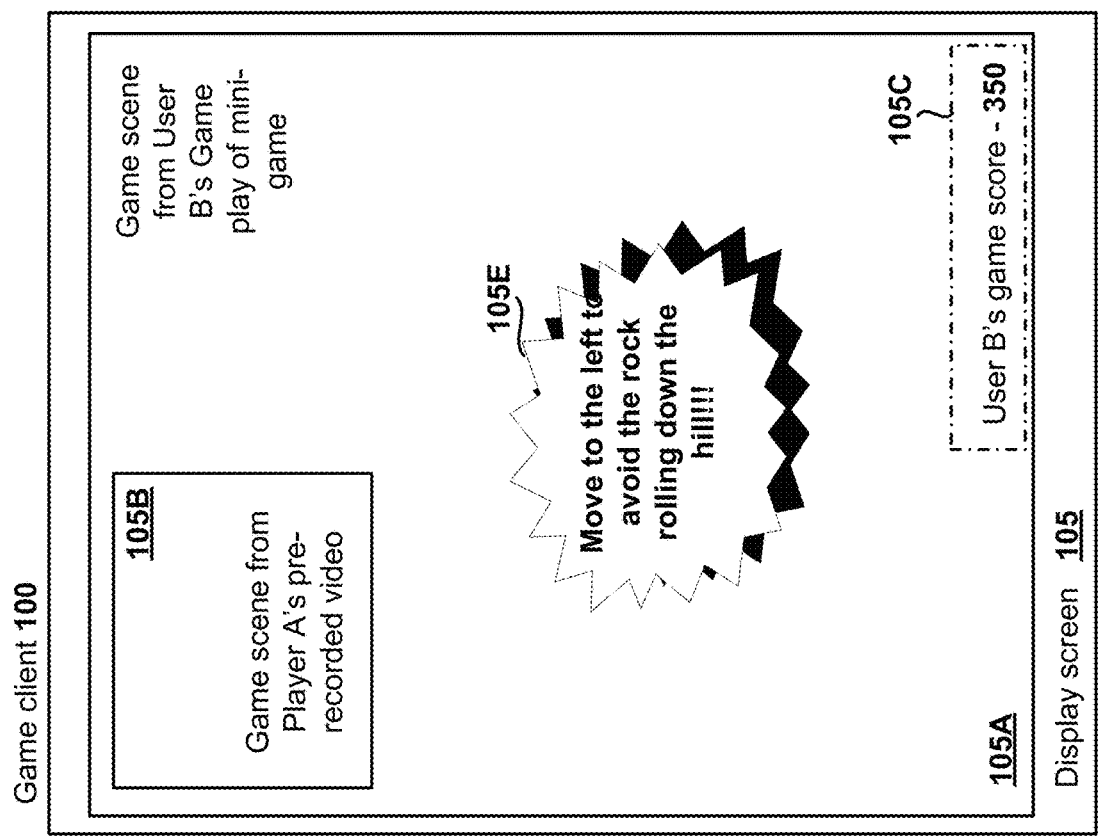
FIGS. 7A, 7B and 7C illustrate a representation of a game client used for rendering different types of informational message, in accordance with different embodiments of the invention.
Figure 7B:
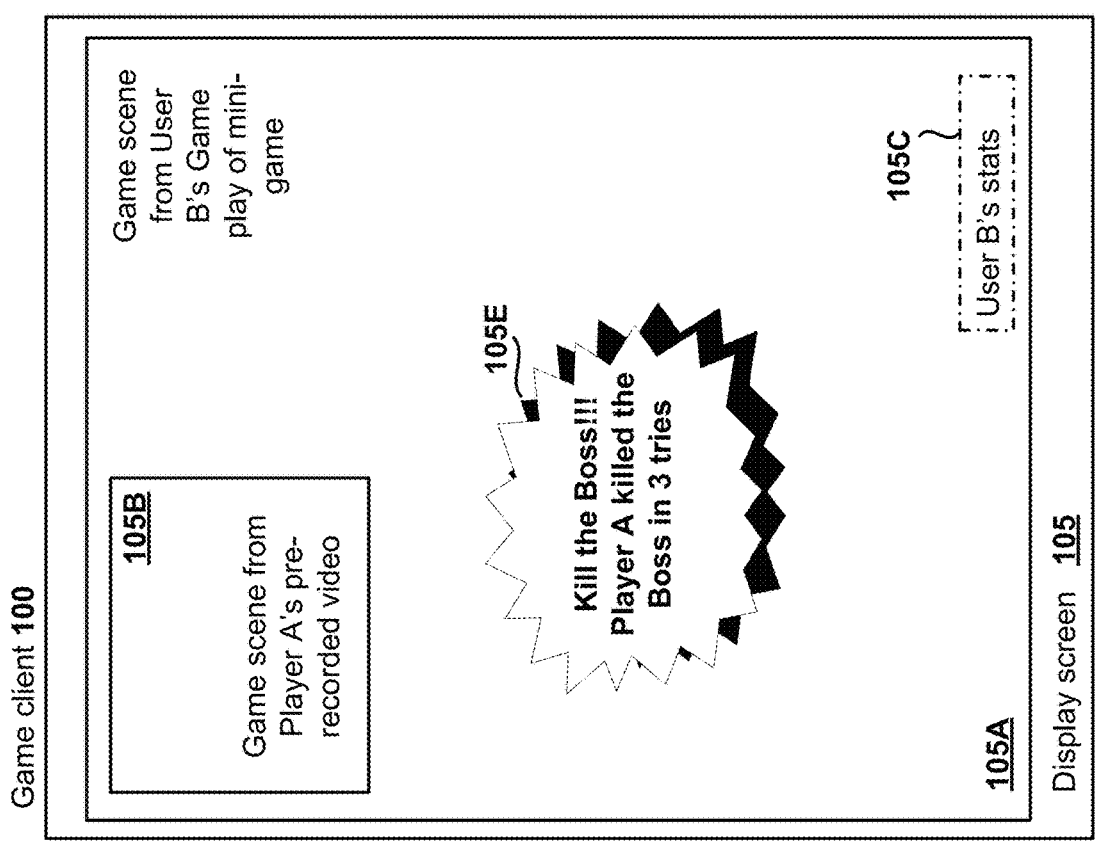
Figure 7C:
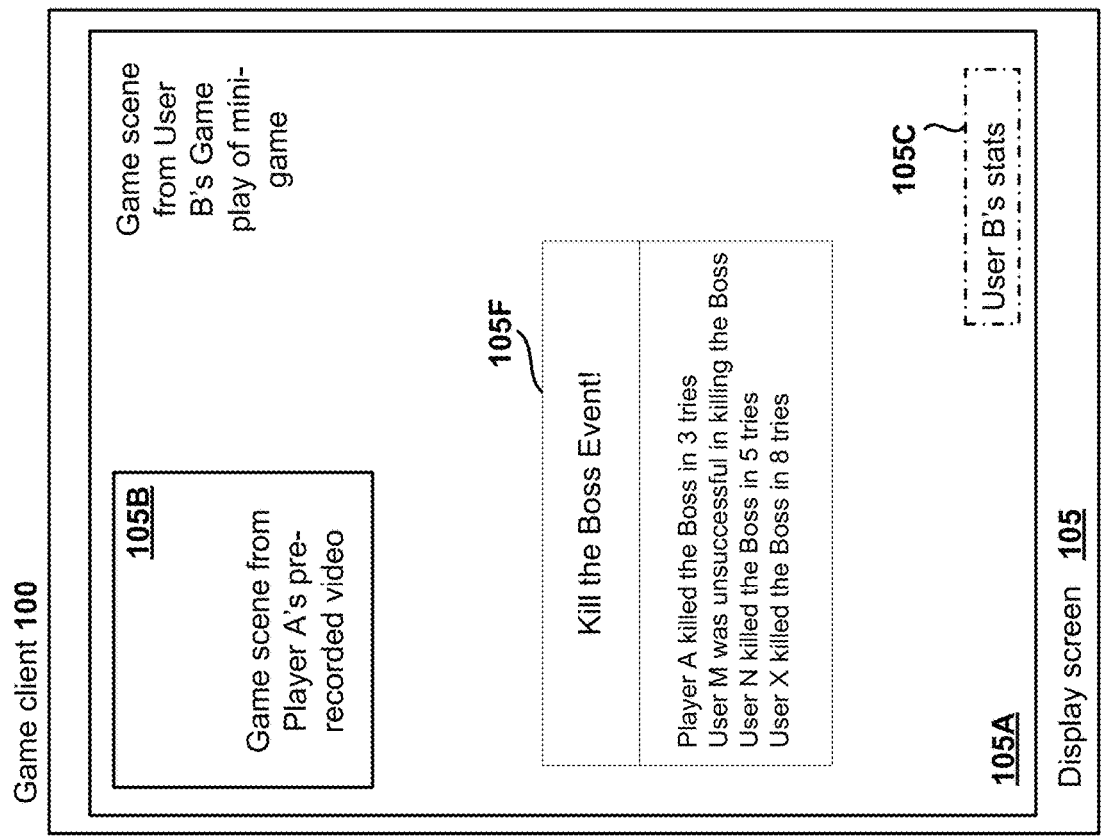

FIGS. 7A-7C illustrate example informational messages that can be presented to the users during game play, in some embodiments of the invention. The informational message provided at the game client 100 may correspond to the game parameters, user attributes and game score identified for the user during game play or for the player from the video recording of the mini-game rendering in the second portion 105B. In some embodiments, different portions of the display screen 105 may be used to render different informational messages. For example, a main portion 105A of the display screen 105 is used to render the game play, a second portion 105B is used to render the pre-recorded video of a player that is synchronized to the game play rendering in the main portion 105A, a separate window 105C within the main portion 105A is used for rendering attributes of a user playing the mini-game, and a separate window 105D within the second portion 105B is used for rendering player related attributes. During game play, a game action of the user for a specific event rendering in the main portion 105 of the display screen may be compared with the corresponding game action of the player. When the game action of the user does not match the game action of the player or in response to the occurrence of an event, an informational message indicating the action taken by the player may be presented as a scene overlay 105E, as illustrated in FIG. 7A. Such overlays are presented while the main portion 105 is rendering the specific event within the game play and the second portion 105B is rendering the pre-recorded video of a player that is synchronized to the game play of the user. In another example, the game score of the user playing the mini-game may be compared to the score achieved by the original player using the full game and/or of other users playing or that have played the mini-game.

In alternate implementations, as illustrated in FIG. 7B, the informational message may provide information of events or challenges that may be coming ahead during game play. In such implementations, the metadata associated with the player's recording may be used to identify game-related parameters, such as a hurdle, challenge, event, etc., that are coming next and informational message related to the parameters may be generated and presented to the user as an informational overlay 105E at the main portion 105A to warn or inform the user of what to anticipate in the game. For example, the information message may include, "Move to the left to avoid the rock rolling down the hill," or "Look out for the fire breathing dragon," etc. Such information may be helpful to warn the user so that the user can adjust their game play strategy to overcome the challenge, etc.

FIG. 7C illustrates an embodiment wherein the user's attributes related to a specific event, hurdle or challenge are compared against that of a player's and/or other users that are simultaneously playing the mini-game or that have already played the mini-game. The results from the comparison may be provided to the game client 100 as informational message for rendering at the main portion 105A of the display screen 105 as and when the user encounters or completes the event, hurdle, or challenge during the game play. For example, when more than one user plays the mini-game simultaneously or sequentially, each of the users' game play is analyzed and the game parameters, user attributes and game scores of each of the users may be compared with that of the other users and the player. The result of the comparison may be presented to the one or more users that are currently engaged in game play of the mini-game. In one implementation, the users' attributes may be presented in a leaderboard format 105F identifying each users game scores for specific sections or points in the game play of the mini-game. Different formats may be adopted for presenting the result of the comparison in a leaderboard. For example, the current user's name or identifier may be highlighted to allow a user to identify his position within the leaderboard. Thus, data provided in the metadata associated with the mini-game may be used to identify and provide various user attributes, game-related parameters, comparative results between friends, users and players, between users, etc.

These informational messages are used to let the user know how they stack against other users, what event is occurring in the player's recording, what event or challenge is ahead, the current user's performance against the player's or other users', etc. Further, these game parameters, user attributes and game score of the user may be stored in the mini-game data store 142 and/or the game network user store 130 and used subsequently for comparing with other users.

It should be noted that the generated mini-game may be further shared by the user with other users by posting to a game cloud system 10 or to one or more social networks of the user. The users identified for sharing may be friends or social contacts identified from the user's one or more social networks, users that the current user interacts with within the game cloud system, users that share similar interests as the current user or the player that generated the mini-game, or generic users. When a user selects the mini-game for game play, an instance of the executable code is executed on the game cloud system and the game play made available to the user on their game client. The player's recording associated with the mini-game is streamed to the game client 100 in real-time. The player's recording is dynamically adjusted to match the game play of the user by intelligently performing a time-shifted synchronization using the metadata available for the mini-game. The user's game play may be recorded to generate a second video that is associated with the mini-game. The mini-game with the second video may be shared with other users identified by the current user or with all users.

The various embodiments allow a player to play a video game. The game play of the player is recorded. The game play records telemetry from the game, and data signals provided in the game by, for example, a game developer. The telemetry provides details of where a player is standing when the game play video was recorded, and the data signal associated with a particular portion of the game that is being recorded may identify that the portion of the data stream is related to "Boss Battle" (i.e., metadata), indicating that the portion of the game play video that is being recorded is during a boss battle.

Using the "smart" video, it is possible to determine what is happening in the game play video moment to moment. When a user selects the video game or a mini-game that was generated out of the video game for game play, corresponding game play video of the player that was recorded earlier, is provided for the user's viewing during the user's game play. In some embodiments, the game play video of the player is provided in picture-in-picture format. So, as the user battles the same monsters as the ones that are in the game play video, the user may be taking a longer time to conquer/defeat/kill the monsters. The system senses the delay and automatically pauses the game play video that is being rendered and waits for the user to catch up. When the system senses that the user is advancing, the system automatically resumes the game play video of the player. If, on the other hand, the user is advancing faster than the game play video, the system senses the speed at which the user is advancing and automatically fast-forwards the game play video to catch up with the user. The various embodiments also performs comparison of statistics of the users using the telemetry to determine how each user performed as compared to other users and such comparison can be done at a granular level by doing a moment to moment comparison, if necessary. The system would also enable playback and rewinding of actual game play. The system is capable of re-creating the actual game play to allow a user to dive back in at any moment by either fast-forwarding or rewinding through the actual game play.

The various embodiments provide ways to intelligently synchronize game recording of a player to game play of a user so that the user has the ability to view the game play of the player during game play by the user. Providing access to mini-games allows users to preview the video game so as to generate an interest in the video game, which can lead to potential purchase. Allowing the users to view the game play of a player, enhances the users interest as it allows them to get familiarized with the controls and logic of the video game, thereby increasing the interest of the users leading to satisfactory game play experience. The embodiments may be used to attract novice users to different games by allowing them to view the game play of an expert player while simultaneously providing them a way to get familiarized with the game controls and game logic. The various embodiments can be used by game developers to introduce newer games in a fast and efficient manner other advantages will become apparent to one skilled in the art.

Figure 8:
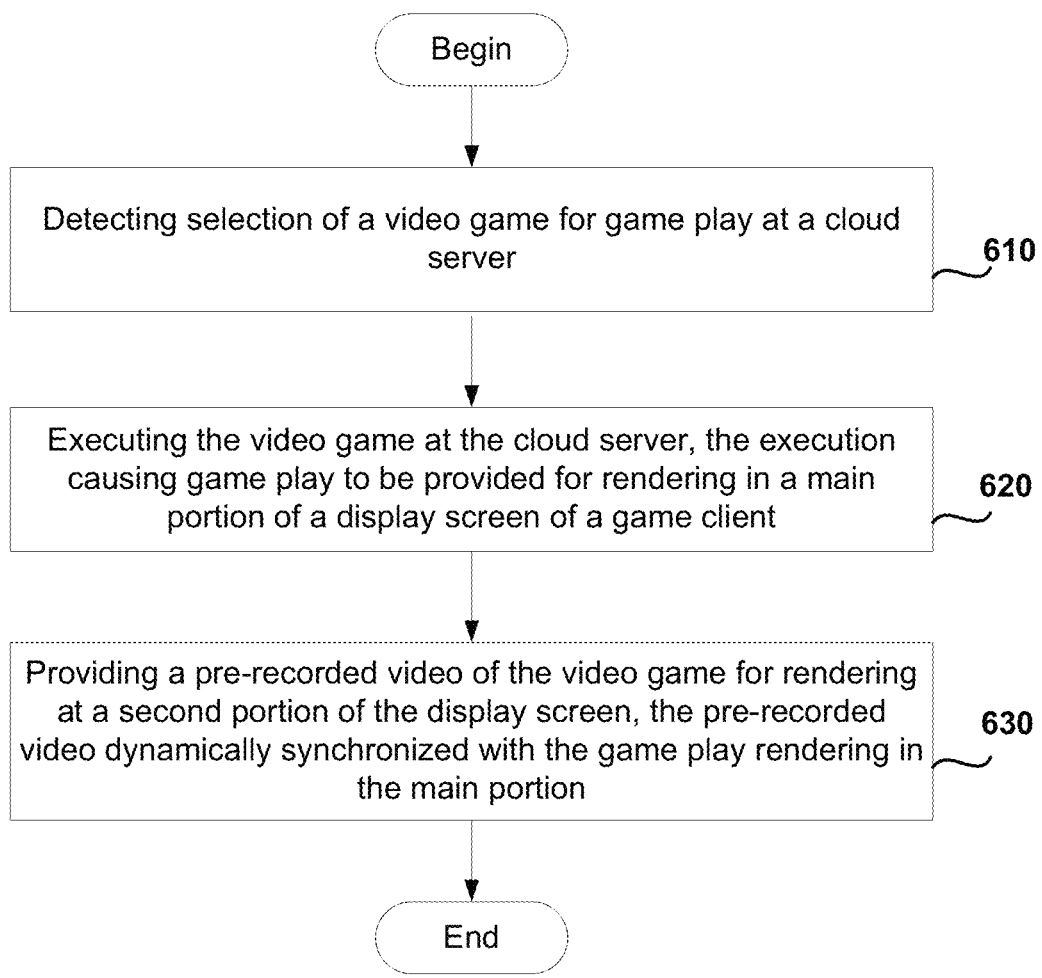
FIG. 8 is a flow chart of operations for an exemplary method used for managing execution and sharing of mini-games over a game cloud system, in accordance with one embodiment of the present invention.

FIG. 8 is a flow chart illustrating an exemplary method for managing execution and sharing of mini-games over a game cloud system, in accordance with one embodiment of the present invention. The method begins at operation 610, wherein a selection of a video game for game play is detected at a cloud server. In response to the selection, the video game is executed for game play at the cloud server, as illustrated in operation 620. The execution of the video game causes the game play to be provided to a game client for rendering on a main portion of a display screen associated with the game client. In addition to providing the game play, the cloud server will provide a pre-recorded video associated with the video game to the game client for rendering in a second portion of the display screen of the game client, as illustrated in operation 630. The pre-recorded video provided to the game client is dynamically synchronized with the game play of the video game currently rendering on the main portion, so as to match a game scene of the pre-recorded video with the game scene of the game play rendering in the main portion. The dynamic synchronization may include automatically advancing or rewinding video frames of the pre-recorded video so as to match a game scene rendering in the second portion matches with the game scene of the game play rendering in the main portion. Alternately, the synchronization may include adjusting rendering speed of the video frames provided in the second portion to match with the game speed of the user's game play.

Figure 9:
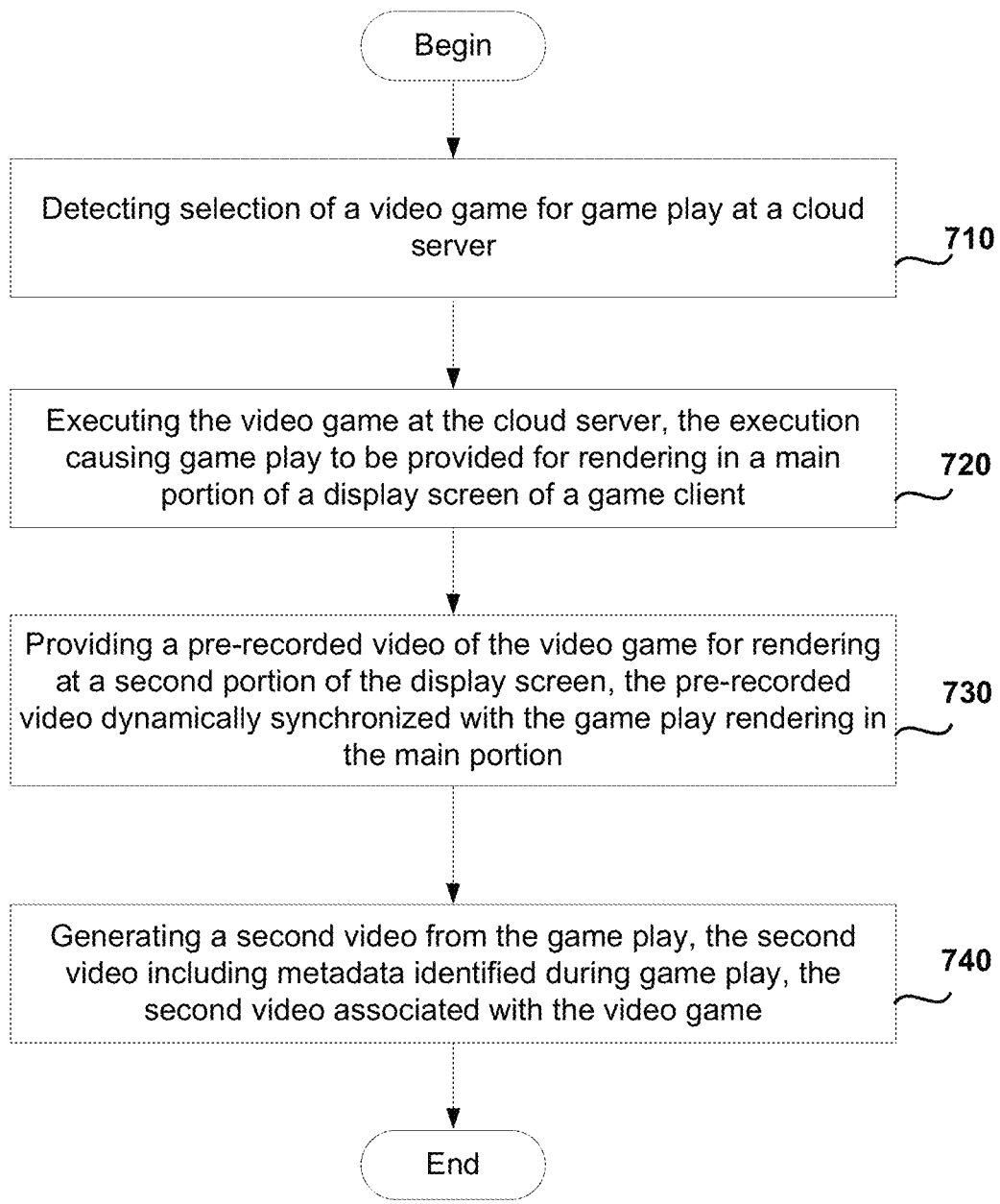
FIG. 9 is a flow chart of operations for an exemplary method used for managing execution and sharing of mini-games over a game cloud system, in accordance with an alternate embodiment of the present invention.

FIG. 9 illustrates an alternate method for managing execution and sharing of mini-games, in another embodiment of the invention. The method begins at operation 710, wherein a selection of a video game for game play is detected at a cloud server. In response to the selection, the video game is executed for game play at the cloud server, as illustrated in operation 720. The execution of the video game causes the game play to be provided to a game client for rendering on a main portion of a display screen associated with the game client. In addition to providing the game play, the cloud server will provide a pre-recorded video associated with the video game to the game client for rendering in a second portion of the display screen of the game client, as illustrated in operation 730. The pre-recorded video provided to the game client is dynamically synchronized with the game play of the video game currently rendering on the main portion, so as to match a game scene of the pre-recorded video with the game play rendering in the main portion.

A second video is generated from the game play, as illustrated in operation 740. The second video includes all the actions provided by the user during game play, the game parameters as well as metadata that were generated during the game play of the video game. The second video is also associated with the video game. The second video may be used to restart the game play of the video game or the metadata provided in the second video may be used to compare attributes of the user with other users or players of the video game.

Figure 10:
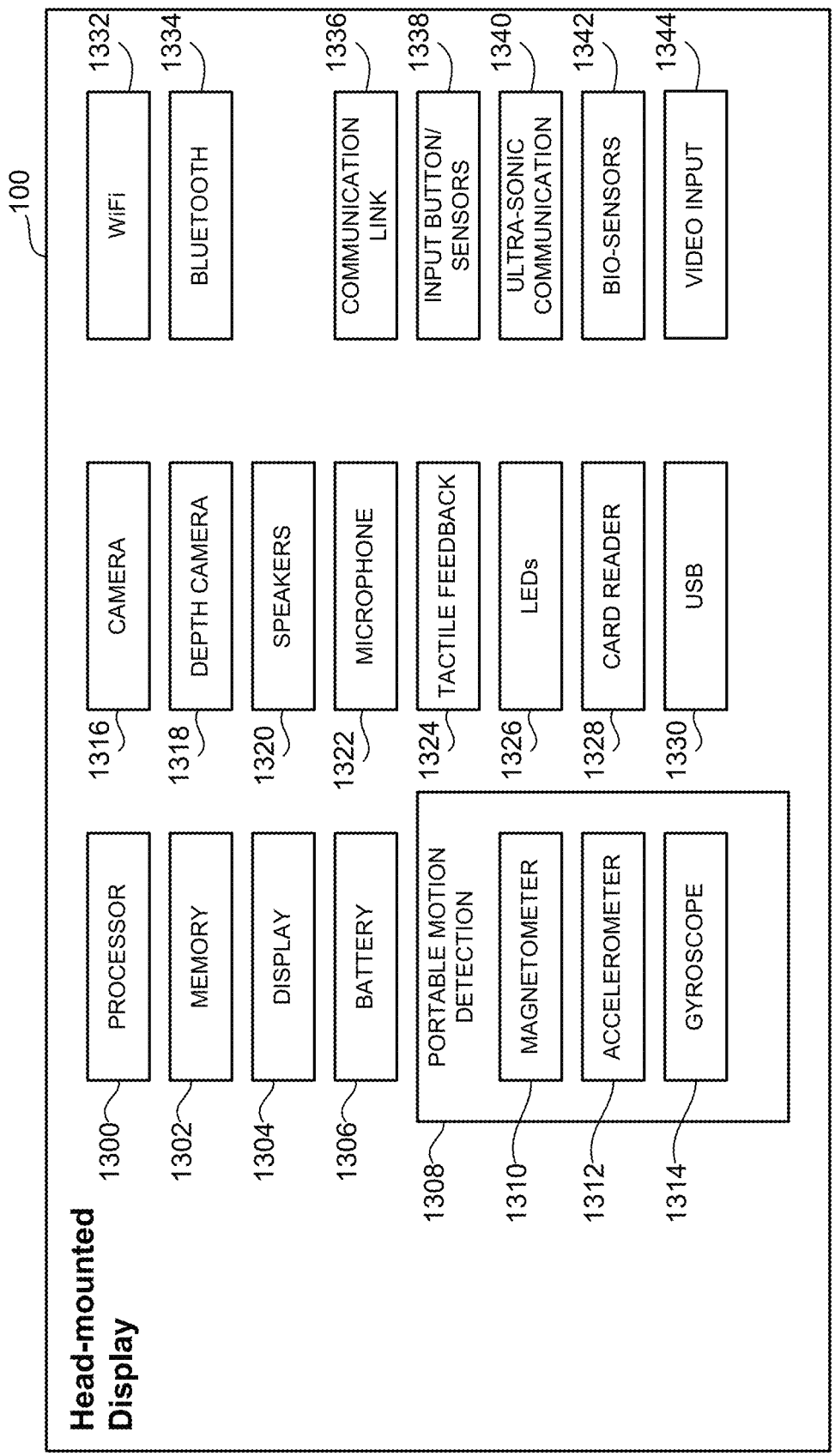
FIG. 10 illustrates components of a head-mounted display that acts as a game client, in accordance with an embodiment of the invention.

FIG. 10 illustrates an example head-mounted display 100 that is used as a game client, in accordance with an embodiment of the invention. The head-mounted display 100 includes a processor 1300 for executing program instructions. A memory 1302 is provided for storage purposes, and may include both volatile and non-volatile memory. A display 1304 is included which provides a visual interface that a user may view. A battery 1306 is provided as a power source for the head-mounted display 100. A motion detection module 1308 may include any of various kinds of motion sensitive hardware, such as a magnetometer 1310, an accelerometer 1312, and a gyroscope 1314.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1312 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 1310 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 1312 is used together with magnetometer 1310 to obtain the inclination and azimuth of the head-mounted display 100.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 1314 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 1316 is provided for capturing images and image streams of a real environment. More than one camera may be included in the head-mounted display 100, including a camera that is rear-facing (directed away from a user when the user is viewing the display of the head-mounted display 100), and a camera that is front-facing (directed towards the user when the user is viewing the display of the head-mounted display 100). Additionally, a depth camera 1318 may be included in the head-mounted display 100 for sensing depth information of objects in a real environment.

The head-mounted display 100 includes speakers 1320 for providing audio output. Also, a microphone 1322 may be included for capturing audio from the real environment, including sounds from the ambient environment, speech made by the user, etc. The head-mounted display 100 includes tactile feedback module 1324 for providing tactile feedback to the user. In one embodiment, the tactile feedback module 1324 is capable of causing movement and/or vibration of the head-mounted display 100 so as to provide tactile feedback to the user.

LEDs 1326 are provided as visual indicators of statuses of the head-mounted display 100. For example, an LED may indicate battery level, power on, etc. A card reader 1328 is provided to enable the head-mounted display 100 to read and write information to and from a memory card. A USB interface 1330 is included as one example of an interface for enabling connection of peripheral devices, or connection to other devices, such as other portable devices, computers, etc. In various embodiments of the head-mounted display 100, any of various kinds of interfaces may be included to enable greater connectivity of the head-mounted display 100.

A WiFi module 1332 is included for enabling connection to the Internet or a local area network via wireless networking technologies. Also, the head-mounted display 100 includes a Bluetooth module 1334 for enabling wireless connection to other devices. A communications link 1336 may also be included for connection to other devices. In one embodiment, the communications link 1336 utilizes infrared transmission for wireless communication. In other embodiments, the communications link 1336 may utilize any of various wireless or wired transmission protocols for communication with other devices.

Input buttons/sensors 1338 are included to provide an input interface for the user. Any of various kinds of input interfaces may be included, such as buttons, touchpad, joystick, trackball, etc. An ultra-sonic communication module 1340 may be included in head-mounted display 100 for facilitating communication with other devices via ultra-sonic technologies.

Bio-sensors 1342 are included to enable detection of physiological data from a user. In one embodiment, the bio-sensors 1342 include one or more dry electrodes for detecting bio-electric signals of the user through the user's skin.

A video input 1344 is configured to receive a video signal from a primary processing computer (e.g. main game console) for rendering on the HMD. In some implementations, the video input is an HDMI input.

It should be appreciated that a given video game may be developed for a specific platform and a specific associated controller device but may be accessed and executed using inputs from a different game client or input device. For example, a video game might have been developed for a game console and its associated controller, whereas the user might be accessing a cloud-based version of the video game from a game client, such as a personal computer utilizing a keyboard and mouse. In such a scenario, the input parameter configuration of the game client and the associated controller are used to determine the mapping of the inputs to corresponding game inputs for influencing the outcome of the video game and the format of the video of the recording video game to be presented at the game client.

In another example, a user may access the cloud gaming system via a tablet computing device, a touchscreen smartphone, or other touchscreen driven device. In this case, the game client and the controller device are integrated together in the same device, with inputs being provided by way of detected touchscreen inputs/gestures. For such a game client, the input parameter configuration may define particular touchscreen inputs corresponding to game inputs for the mini-game. For example, buttons, a directional pad, or other types of input elements might be displayed or overlaid during game play of the mini-game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the game client may serve as a connection point for a controller device. That is, the controller device communicates via a wireless or wired connection with the game client to transmit inputs from the controller device to the client device. The game client may in turn process these inputs and then transmit input data to the game server via a network (e.g. accessed via a local networking device such as a router). However, in other embodiments, the controller can itself be a networked device, with the ability to communicate inputs directly via the network to the game server, without being required to communicate such inputs through the game client first. For example, the controller might connect to a local networking device (such as the aforementioned router) to send to and receive data from the game server. Thus, while the game client may still be required to receive video output from the cloud-based video game and render it on local display, input latency can be reduced by allowing the controller to send inputs directly over the network to the cloud game server, bypassing the client device.

In one embodiment, a networked controller and game client can be configured to send certain types of inputs directly from the controller to the game server, and other types of inputs via the game client. For example, inputs whose detection does not depend on any additional hardware or processing apart from the controller itself can be sent directly from the controller to the game server via the network, bypassing the game client. Such inputs may include button inputs, joystick inputs, embedded motion detection inputs (e.g. accelerometer, magnetometer, gyroscope), etc. However, inputs that utilize additional hardware or require processing by the game client can be sent by the game client to the game server. These might include captured video or audio from the game environment that may be processed by the game client before sending to the game server. Additionally, inputs from motion detection hardware of the controller might be processed by the game client in conjunction with captured video to detect the position and motion of the controller, which would subsequently be communicated by the game client to the game server and used to generate telemetric information of the metadata associated with the mini-game. It should be appreciated that the controller device in accordance with various embodiments may also receive data (e.g. feedback data) from the game client or directly from the game server.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

It should be noted that the operations of the various embodiments may require multiple servers and/or execution platforms to enable quick access to databases and presentations of content to remotely located users. The game cloud system may be used to perform operations of compression utilizing any number of compression techniques. The compression techniques may use standard encoders, which would then allow standard decoders on game clients to access and play the video games. The management of the video games and distribution can include a number of data centers, direction servers, quality of service testers, direction and redirection of lower latency data centers, and management of the instant play demonstrations. It should also be understood that these operations and tasks will utilize special purpose computers that are designed for streaming and low latency due to the remote execution of the video games, and the delivery of appropriate content to the game clients.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for sharing game play of a video game through a game cloud system, comprising:
   providing a mini-game for game play at the game cloud system, wherein the mini-game is associated with executable code generated using a portion of the video game and a pre-recorded video of a prior game play of the portion of the video game; and
   executing the executable code associated with the mini-game at the game cloud system, in response to selection of the mini-game by a user, the executing causes,
   a game scene from the game play of the mini-game to be provided for rendering in a first portion of a display screen of a game client of the user, and
   the pre-recorded video associated with the mini-game to be provided for rendering in a second portion of the display screen, wherein rendering speed of the pre-recorded video streaming from the game cloud system is dynamically adjusted to substantially synchronize with speed of game play of the mini-game.

2. The method of claim 1, wherein the dynamic adjustment is performed by the game cloud system without requiring user input and is performed based on game state of the mini-game.

3. The method of claim 1, wherein the mini-game is available in the game cloud system for sharing.

4. The method of claim 1, wherein the dynamic adjustment is done by doing a temporal comparison of the game play of the user with game play included in the pre-recorded video, the temporal comparison is done using metadata captured during the game play and metadata associated with the pre-recorded video.

5. The method of claim 1, wherein the executable code of the mini-game includes set-up parameters of the video game from which the mini-game is generated.

6. The method of claim 1, wherein dynamically adjusting includes automatically adjusting rendering speed of the pre-recorded video rendering in the second portion upward or downward to allow the game scene of the game play rendering in the first portion of the display screen to follow game scene from the pre-recorded video rendering in the second portion.

7. The method of claim 6, wherein dynamically adjusting includes,
   providing a signal to pause the pre-recorded video rendering in the second portion when the game scene of the pre-recorded video does not match with the game scene of the game play; and
   providing a signal to resume the rendering of the pre-recorded video in the second portion upon detecting the game scene of the game play is following the game scene of the pre-recorded video.

8. The method of claim 1, further includes,
   providing an option to select an entry point from the pre-recorded video of the mini-game currently rendering in the second portion of the display screen, the entry point defining a starting location within the mini-game to begin game play of the mini-game.

9. The method of claim 1, wherein the mini-game is associated with a plurality of pre-recorded videos generated from prior game plays of the mini-game by a plurality of players, each pre-recorded video of the plurality of pre-recorded videos showing variations in game play of the mini-game, and
   wherein the selection of the mini-game for game play causes selection of a specific one of the plurality of pre-recorded videos for rendering in the second portion, the selection of the specific one of the plurality of pre-recorded videos includes,
   identifying attributes of players associated with the plurality of pre-recorded videos, the attributes of the players obtained from metadata associated with the mini-game; and
   identifying a specific player whose attributes closely match attributes of the user, the pre-recorded video of the specific player selected for rendering in the second portion during game play of the mini-game by the user.

10. The method of claim 1, wherein the video game is associated with a plurality of mini-games generated by a plurality of players during prior game plays of the video game, the plurality of mini-games ranked based on amount of interactions detected at each mini-game, and wherein the selection of the mini-game for game play is based on ranking.

11. The method of claim 1, further includes,
    identifying attributes of the user during the game play of the mini-game, the attributes being dynamically determined based on game input provided by the user during the game play; and
    providing the attributes of the user for rendering in the first portion of the display screen alongside the game scene being rendered, the attributes providing live statistics of the user.

12. The method of claim 1, wherein providing the pre-recorded video further includes,
    formatting the pre-recorded video to enable rendering of the pre-recorded video in the second portion of the display screen.

* * * * *